(12) United States Patent
Nakajima

(10) Patent No.: US 7,116,884 B2
(45) Date of Patent: Oct. 3, 2006

(54) OPTICAL TRANSMISSION PATH FORMATION TECHNIQUE

(75) Inventor: Toshihiro Nakajima, Hamamatsu (JP)

(73) Assignee: Yamaha Corporation, (JP)

( * ) Notice: Subject to any disclaimer, the term of this patent is extended or adjusted under 35 U.S.C. 154(b) by 0 days.

(21) Appl. No.: 10/440,254

(22) Filed: May 19, 2003

(65) Prior Publication Data

US 2003/0215206 A1   Nov. 20, 2003

(30) Foreign Application Priority Data

May 20, 2002 (JP) .............................. 2002-144420
Jun. 7, 2002 (JP) .............................. 2002-166707

(51) Int. Cl.
*G02B 6/00* (2006.01)

(52) U.S. Cl. .......................... 385/137; 385/59; 385/52; 385/120

(58) Field of Classification Search ........ 385/137–138, 385/52, 115, 120, 59–60, 136
See application file for complete search history.

(56) References Cited

U.S. PATENT DOCUMENTS

| | | | |
|---|---|---|---|
| 4,812,002 A | 3/1989 | Kato et al. | |
| 5,135,590 A | 8/1992 | Basavanhally | |
| 5,185,846 A | 2/1993 | Basavanhally | |
| 5,566,262 A | 10/1996 | Yamane et al. | |
| 6,470,123 B1 | 10/2002 | Sherman et al. | |
| 6,618,541 B1 * | 9/2003 | Kaiser et al. ................ | 385/137 |
| 6,633,719 B1 * | 10/2003 | Basavanhally et al. ..... | 385/137 |
| 6,766,085 B1 | 7/2004 | Fouquet et al. | |
| 6,766,086 B1 * | 7/2004 | Sherman et al. .............. | 385/52 |
| 2002/0154882 A1 | 10/2002 | Moran | |
| 2003/0215206 A1 * | 11/2003 | Nakajima ................... | 385/137 |
| 2004/0028344 A1 | 2/2004 | Kang et al. | |
| 2004/0131326 A1 * | 7/2004 | Miller et al. ................. | 385/137 |

FOREIGN PATENT DOCUMENTS

JP         63-281107       11/1988

(Continued)

OTHER PUBLICATIONS

Japanese Office Action (for JP2002-166707) issued Jun. 14, 2005.

(Continued)

*Primary Examiner*—Leonidas Boutsikaris
(74) *Attorney, Agent, or Firm*—Dickstein, Shapiro, LLP.

(57) ABSTRACT

A holder for holding optical fibers has pin inserting holes to which corresponding positioning pins are pierced from one end to another. An optical fiber fixing plate has fixing holes corresponding to the optical fibers and pin inserting holes corresponding to the positioning pins. On an equipping surface of the fixing plate is formed a reinforcement layer having piercing holes corresponding to the fixing holes and pin piercing holes corresponding to the pin inserting holes. Each optical fiber is fixed and adhered by inserting to each fixing hole while the pins are inserted to the pin inserting holes of the holder, pin piercing holes of the reinforcement layer and the pin inserting holes of the fixing plate. A front surface of the fixing plate is planarized by polishing the surface. Positions of the optical fibers are easily defined at an end surface of the optical fiber holder with high precision.

17 Claims, 23 Drawing Sheets

FOREIGN PATENT DOCUMENTS

| | | |
|---|---|---|
| JP | 4-288507 | 10/1992 |
| JP | 04-288507 * | 10/1992 |
| JP | 08-160242 | 6/1996 |
| JP | 09-203822 | 8/1997 |
| JP | 10-268145 | 10/1998 |
| JP | 11-72644 | 3/1999 |
| JP | 2001-241180 | 9/2001 |

OTHER PUBLICATIONS

Japanese Office Action (for JP2002-144420) issued Jun. 14, 2005.

* cited by examiner

OPTICAL TRANSMISSION PATH FORMATION TECHNIQUE

CROSS REFERENCE TO RELATED APPLICATION

This application is based on Japanese Patent Applications 2002-144420, filed on May 20, 2002, and 2002-166707, filed on Jun. 7, 2002, the entire contents of which are incorporated herein by reference.

BACKGROUND OF THE INVENTION

A) Field of the Invention

The present invention relates to optical transmission path forming techniques using optical fibers, and more particularly to an optical fiber array, and an optical fiber fixing plate to be used for manufacturing an optical fiber array.

B) Description of the Related Art

Conventionally, two-dimensional optical fiber arrays have already been suggested by the same applicant of the present invention such as shown in FIGS. 45 and 46 (for example, refer to the JP-A 2001-241180).

The optical fiber arrays shown in FIGS. 45 and 46 have holding holes $J_1$ to $J_8$ that penetrate from one end surface of an optical fiber holder 1 to another end surface. Also, at the end surface of the holder 1, a positioning plate 2 that has positioning holes $H_1$ to $H_8$ corresponding to the holding holes $J_1$ to $J_8$ is attached. Optical fibers $F_1$ to $F_8$ are pierced from the holding holes $J_1$ to $J_8$ in a condition of being equipped with the positioning plate 2 and fixed by piercing through the positioning holes $H_1$ to $H_8$. According to this type of optical fiber arrays, the positioning plate 2 can be formed easily and precisely, and positioning with high precision is possible.

According to the above-described conventional technique, a metallic positioning plate 2 is equipped onto a surface of the end of the holder 1.

When the positioning plate 2 is attached on the surface of the end of the holder 1, it is necessary to position a positioning hole corresponding to each holding hole precisely at micron level, and the positioning is not easy. If the positioning is not sufficient, the optical fiber may be broken during insertion.

Since the positioning plate 2 is very thin in thickness such as about 100 μm, it is difficult to hold the positioning plate 2 by its four side surfaces. Then, when the positioning plate 2 is equipped onto the surface of the end of the holder 1, it is normal that a main surface on the holder 1 side of the positioning plate 2 is adhered on the surface of the end of the holder 1 of the positioning plate 2 with an adhesive in order to be fixed. In this case, the operation to adhere the main surface of the end of the holder side 1 of the positioning plate 2 on the surface of the end of the holder 1 is not easy. If planes are not enough parallel, the adhesive layer will be uneven, and trouble such as curving of the positioning plate 2 and the like occurs at a time of heat expansion.

After attaching the positioning plate 2 on the surface of the end of the holder 1, each optical fiber is pierced to each positioning hole such as $H_1$ and the like via each holding hole such as $J_1$ and the like, and the optical fiber is fixed by plating process that fills up metal between each positioning hole and the optical fiber. Then, after cutting the optical fiber that is projected from the front surface of the positioning plate 2, the front surface of the positioning plate 2 is polished for planarization. Since mechanical strength of the positioning plate 2 is weaken in a fiber penetrating part to which a multiplicity of the positioning holes are configured, it is injected backward or bumped forward during the polishing process. Then, throb is caused, and sufficient planarity may not be obtained.

SUMMARY OF THE INVENTION

It is an object of the present invention to provide a novel optical fiber array, its manufacturing method and an optical fiber fixing plate which can determine position of optical fibers at one end surface of an optical fiber holder with ease and at high precision.

According to one aspect of the present invention, there is provided an optical fiber array, comprising: an optical fiber; an optical fiber holder having an optical fiber holding hole corresponding to the optical fiber wherein the optical fiber pierces from one end of the optical fiber holding holes to another end, and at least either one of positioning pin inserting hole or positioning pin formed on the one end surface; an optical fiber fixing plate having an optical fiber fixing hole corresponding to the optical fiber holding hole formed to pierce one main surface of the optical fiber fixing plate to another main surface with increasing its size, and either one of a positioning pin in correspondence with the positioning pin inserting hole formed on the one end surface of the optical fiber folder or positioning pin inserting hole formed on the another main surface in correspondence with the positioning pin formed on the one end surface of the optical fiber folder; and a fixing device that fixes the optical fiber to the optical fiber fixing plate in a condition that the optical fiber fixing plate is attached to the one end surface of the optical fiber holder by fitting the positioning pin into the positioning pin inserting hole and the optical fiber is inserted to the corresponding optical fiber holding hole of the optical fiber holder and the corresponding optical fiber fixing hole of the optical fiber fixing plate.

According to the optical fiber array of the present invention, the positioning pin is fitted in the positioning pin by inserting therein, and the optical fiber fixing plate is equipped on one end surface of the optical fiber holder to arrange positioning of the optical fiber holder and the optical fiber fixing plate. Therefore, the optical fiber fixing hole corresponding to the optical fiber fixing plate can be defined positions to each optical fiber holding holes of the optical fiber holder easily and precisely.

Also, since the optical fiber fixing plate can be formed with sub-micron precision by a thin film process, high precise positioning of the optical fiber can be executed at one end surface of the optical fiber holder. Since the optical fiber fixing plate is equipped at one end surface of the optical fiber holder so that a large-sized end of each optical fiber fixing hole is faced to other end of the optical fiber holder, the optical fiber can be inserted from other end of the optical fiber holder to each optical fiber fixing hole.

According to another aspect of the present invention, there is provided an optical fiber array manufacturing method, comprising the steps of: (a) preparing an optical fiber, an optical fiber holder having an optical fiber holding hole corresponding to the optical fiber wherein the optical fiber pierces from one end of the optical fiber holding holes to another end, and at least either one of positioning pin inserting hole or positioning pin formed on the one end surface, an optical fiber fixing plate having an optical fiber fixing hole corresponding to the optical fiber holding hole formed to pierce one main surface of the optical fiber fixing plate to another main surface with increasing its size, and either one of a positioning pin in correspondence with the positioning pin inserting hole formed on the one end surface of the optical fiber folder or positioning pin inserting hole formed on the another main surface in correspondence with the positioning pin formed on the one end surface of the optical fiber folder; (b) attaching the optical fiber fixing plate to the one end surface of the optical fiber holder by fitting the positioning pin into the positioning pin inserting hole; (c) inserting the optical fiber to the corresponding optical fiber holding hole of the optical fiber holder and the corresponding optical fiber fixing hole of the optical fiber fixing plate from the another end surface of the optical fiber holder in a condition that the optical fiber fixing plate is attached to the optical fiber holder; and (d) fixing the optical fiber to the optical fiber fixing plate in a condition that the optical fiber fixing plate is attached to the one end surface of the optical fiber holder by fitting the positioning pin into the positioning pin inserting hole and the optical fiber is inserted to the corresponding optical fiber holding hole of the optical fiber holder and the corresponding optical fiber fixing hole of the optical fiber fixing plate.

According to a manufacturing method of the optical fiber array of the present invention, the before-described optical fiber array of the present invention can be manufactured easily and precisely.

In the manufacturing method of the optical fiber array of the present invention, the optical fiber fixing plate is equipped on one end surface of the optical fiber holder, and each optical fiber is fixed on the optical fiber holder being a condition that each optical fiber is inserted in the optical fiber fixing hole corresponding to the optical fiber holding hole corresponding to the optical fiber holder and the before-described optical fiber fixing plate. Then one main surface of the optical fiber fixing plate may be polished to planarize being in a condition that each optical fiber is fixed on the optical fiber fixing plate and the before-described optical fiber holder.

By doing that, the end surface of the optical fiber holder can be smooth and clean surface, and coupling loss can be decreased at a time of coupling with other optical device.

In the manufacturing method of the optical fiber array of the present invention, a depth of the positioning pin inserting hole of the optical fiber holder is deeper than a length of the positioning pin of the optical fiber fixing plate, and the optical fiber is fixed at a section of the optical fiber holder deeper than a predetermined position that is deeper than a tip position of the positioning pin and shallower than a bottom of the positioning pin inserting hole in a condition that the optical fiber fixing plate is attached to the one end surface of the optical fiber holder by fitting the positioning pin into the positioning pin inserting hole and the optical fiber is inserted to the corresponding optical fiber holding hole of the optical fiber holder and the corresponding optical fiber fixing hole of the optical fiber fixing plate. Then, the optical fiber fixing plate and the positioning pin are removed in a condition that the optical fiber is fixed to the optical fiber fixing plate and the optical fiber holder, and a section of the optical fiber holder from the one end surface to the predetermined point is removed. Thereafter, a surface where the section of the optical fiber holder is removed is planarized with keeping the optical fiber being fixed at the section of the optical fiber holder deeper than the predetermined position on the one end surface and using a reaming portion of the positioning pin inserting hole as a guide pin inserting hole.

By doing that, on one end surface of the optical fiber holder, other optical device (or connector) can be coupled easily and precisely by using the guide pin inserting hole and the guide pin.

According to still another aspect of the present invention, there is provided an optical fiber fixing plate used by attaching to one end surface of an optical fiber holder that has an optical fiber holding hole corresponding to the optical fiber wherein the optical fiber pierces from one end of the optical fiber holding holes to another end, and at least either one of positioning pin inserting hole or positioning pin formed on the one end surface, the optical fiber fixing plate comprising: an optical fiber fixing hole corresponding to the optical fiber holding hole formed to pierce one main surface of the optical fiber fixing plate to another main surface with increasing its size; and one of a positioning pin formed on the another main surface in correspondence with the positioning pin inserting hole or positioning pin inserting hole in correspondence with the positioning pin.

DETAILED DESCRIPTION OF THE PREFERRED EMBODIMENTS

Figure 1:
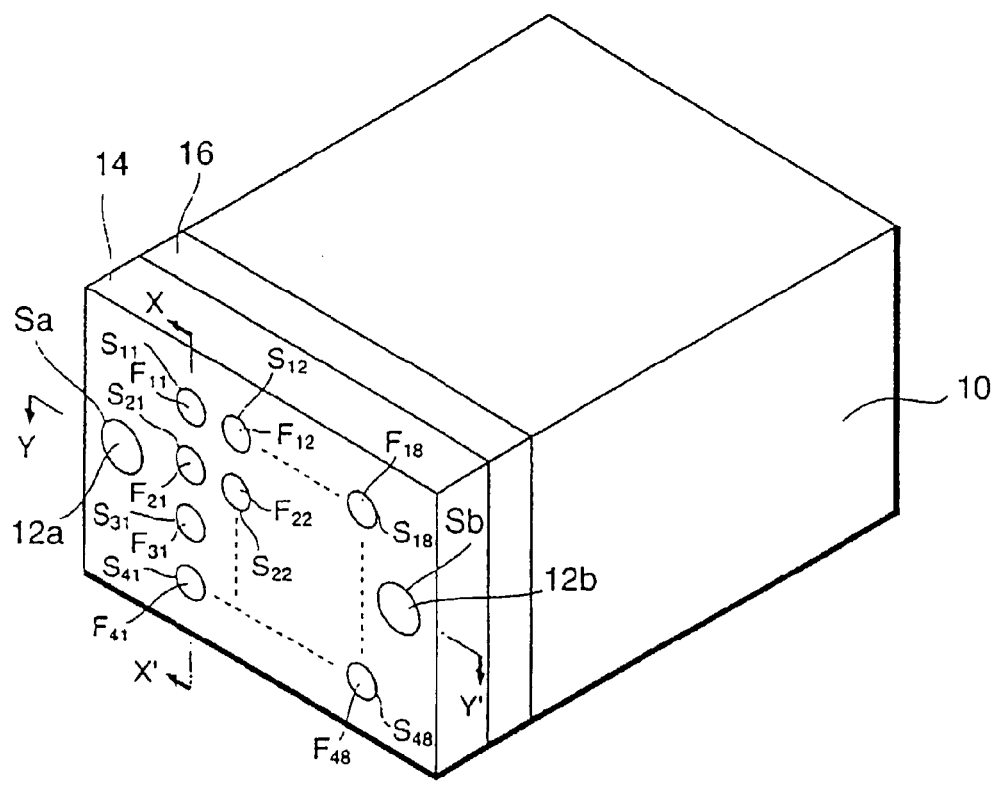
FIG. 1 is a perspective view showing a two-dimensional optical fiber array according to a first embodiment of the present invention.
Figure 2:
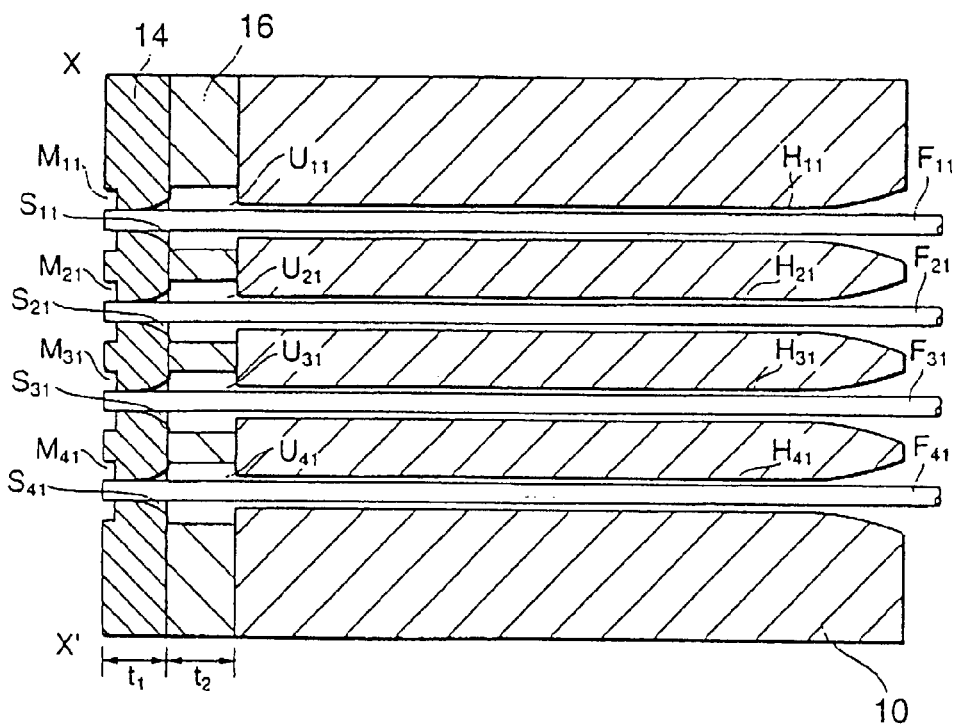
FIG. 2 is a cross sectional view taken along line X–X' shown in FIG. 1.

FIG. 1 shows a two-dimensional optical fiber array according to a first embodiment of the present invention. A cross sectional view taken along line X–X' shown in FIG. 1 is shown in FIG. 2, and a cross sectional view taken along line Y–Y' shown in FIG. 1 is shown in FIG. 3.

The optical fiber holder 10 is, for example, in a square pillar shape, and made of ceramic (for example, zirconium), metal (for example, Ni—Fe alloy), plastic or the likes. The holder 10 has, as shown in FIG. 2, optical fiber holding holes $H_{11}$, $H_{21}$, $H_{31}$, $H_{41}$ arranged in substantially parallel to each another and penetrating the holder 10 from one end surface to another. The holder 10 has holding hole columns, each column being consisted of similar holding holes $H_{11}$ to $H_{41}$. That is, thirty-two optical fiber holding holes are arranged in matrix in the holder 10. A shape of each optical fiber holding hole is, for example, a circle.

Figure 3:
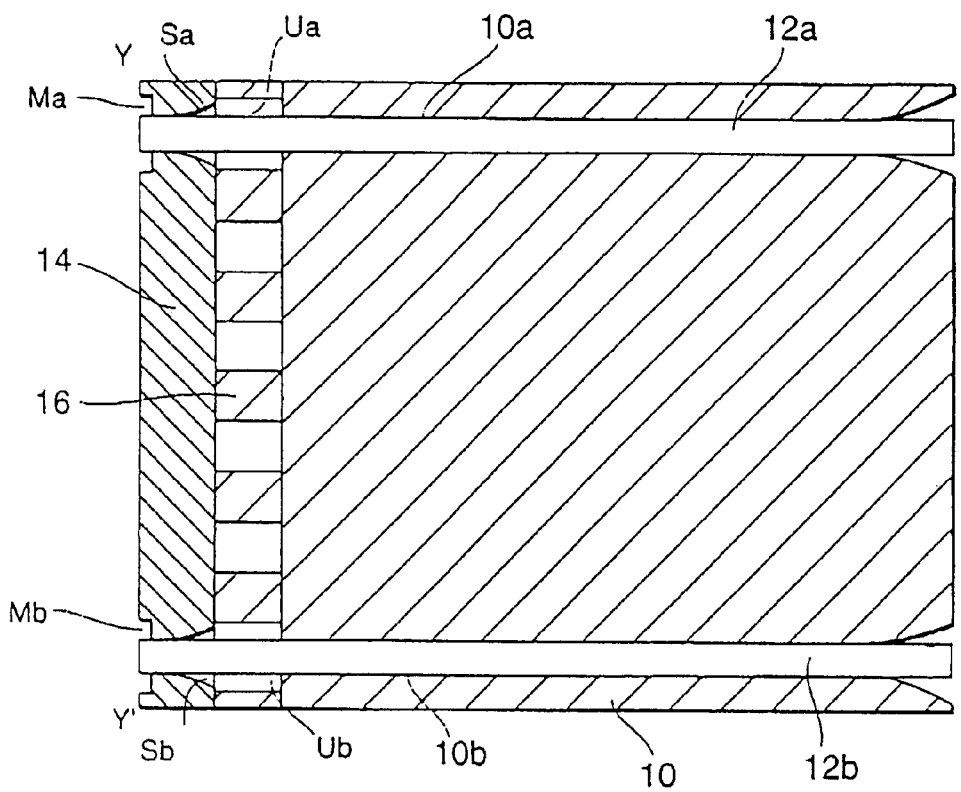
FIG. 3 is a cross sectional view taken along line Y–Y' shown in FIG. 1.

The holder 10 has, as shown in FIG. 3, pin inserting holes 10a and 10b arranged in substantially parallel to each another and penetrating the holder 10 from one end surface to another. The pin inserting holes 10a and 10b are in substantially parallel to each holding hole. As shown in FIGS. 2 and 3, the size of each holding hole such as $H_{11}$ and the like and each of the inserting holes 10a and 10b becomes larger from one end surface toward another end surface of the holder 10. This is for making the operation of inserting the optical fiber and the positioning pin easy.

Figure 4:
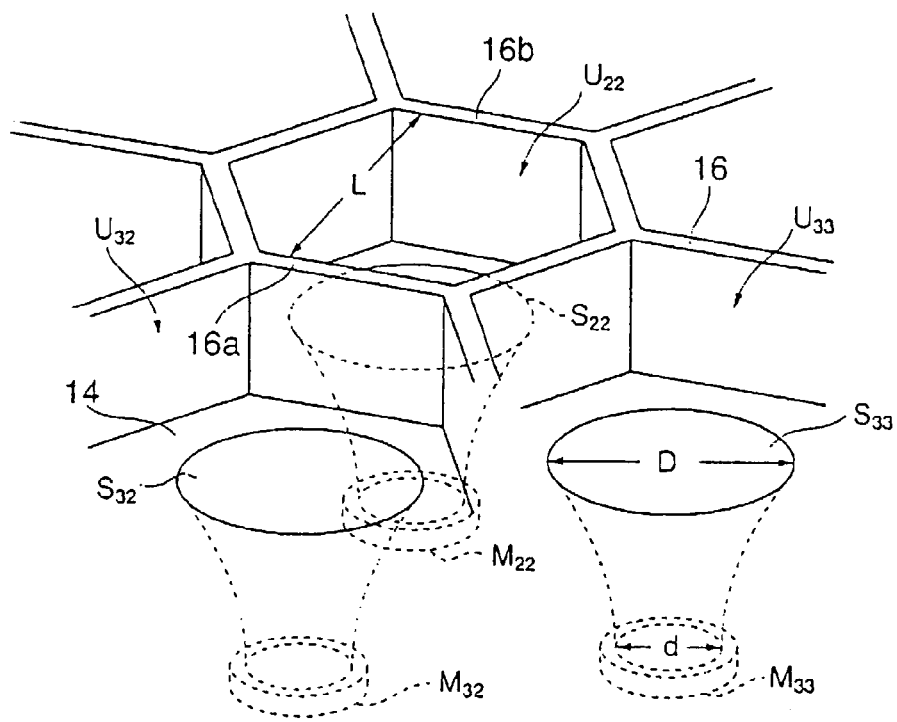
FIG. 4 is an enlarged perspective view showing a part of an equipping surface of the optical fiber fixing plate.

An optical fiber fixing plate 14 is, for example, made of metal such as Ni—Fe alloy that has $t_1$ (refer FIG. 2) in thickness of 50 μm. Optical fiber fixing holes $S_{11}$ to $S_{48}$ are arranged in matrix in correspondence to 32 optical fiber holding holes of the optical fiber holder 10 and are penetrating the holder 10 from one main surface to another main surface. In FIGS. 2 and 4, $S_{22}$, $S_{32}$, $S_{33}$, $S_{11}$, $S_{21}$, $S_{31}$ and $S_{41}$ from the fixing holes $S_{11}$ to $S_{48}$ are shown as examples. The size of each fixing hole becomes larger from one main surface toward another main surface of the fixing plate 14 in order to make easy to insert optical fiber. The form of each fixing hole is a circular form as an example, and the diameter D of a large size end and the diameter d of a small size end can be respectively set to 220 μm and 126 μm as an example.

As shown in FIGS. 1 and 3, pin inserting holes Sa and Sb corresponding to the pin inserting holes 10a and 10b of the holder 10 are arranged on the fixing plate 14 and are penetrating the holder 10 from one main surface to another main surface. The size of pin inserting holes become larger from one main surface to another main surface of the fixing plate 14 in order to make easy to insert optical fiber. The form of each pin inserting hole is a circular form as an example.

As shown in FIGS. 2 and 4, adhesive holes $M_{22}$, $M_{32}$, $M_{33}$, $M_{11}$, $M_{21}$, $M_{31}$ and $M_{41}$ are formed on one main surface of the fixing plate 14 to be continuous with the smaller size ends of the fixing holes $S_{22}$, $S_{32}$, $S_{33}$, $S_{11}$, $S_{21}$, $S_{31}$ and $S_{41}$. The adhesive holes $M_{22}$, $M_{32}$, $M_{33}$, $M_{11}$, $M_{21}$, $M_{31}$ and $M_{41}$ have a diameter larger than the corresponding fixing holes. Also, the same adhesive holes are formed on other fixing holes. Each adhesive hole such as $M_{11}$ and the like is used for adhering and fixing the optical fiber on the fixing plate 14. Also, as shown in FIG. 3, adhesive holes Ma and Mb are formed on one main surface of the fixing plate 14 to be continuous with the smaller size ends of the pin inserting holes Sa and Sb. The adhesive holes Ma and Mb have a diameter larger than the corresponding pin inserting holes. Each of the adhesive holes such as Ma and the likes is used for adhering and fixing the positioning pin on the fixing plate 14. Moreover, in FIG. 1, drawing of each of the adhesive holes such as $M_{11}$ Ma and the likes is omitted for convenience of the explanation.

On another main surface of the fixing plate 14, for example, a reinforcement layer 16 that is made of metal such as Ni—Fe alloy in thickness of 50 μm $t_2$ (refer FIG. 2) is arranged. The reinforcement layer 16 is for reinforcement of mechanical strength of the thin fixing plate 14 in thickness of 50 to 100 μm. As shown in FIGS. 2 and 4, optical fiber piercing holes $U_{22}$, $U_{32}$, $U_{33}$, $U_{11}$, $U_{21}$, $U_{31}$ and $U_{41}$ which are larger in size than the large size end are formed at the large size ends of the fixing holes $S_{22}$, $S_{32}$, $S_{33}$, $S_{11}$, $S_{21}$, $S_{31}$ and $S_{41}$ continuously one by one. Also, the same optical fiber piercing holes are formed for other fixing holes. Arrangement of the optical fiber piercing holes on the reinforcement layer is, for example, a honeycomb arrangement, and distance L of opposite two sides of the hexagon hole consisting each optical fiber piercing hole can be set at 230 μm. The form of each optical fiber piercing hole may be a circular or an ellipse form and may be polygons other than a hexagon (a triangle, a quadrangle, a parallelogram).

On the large edges of the pin inserting holes Sa and Sb of the reinforcement layer 16, as shown in FIG. 3, pin-piercing holes Ua and Ub that is larger than the pin inserting holes Sa and Sb are formed in correspondence with the pin inserting holes Sa and Sb. The form of each pin-piercing holes Ua and Ub is a circular for example or may be polygon or the like. The optical fiber fixing plate 14 having the reinforcement layer 16 can be formed easily and precisely by using the thin film process.

When the optical fiber array in FIG. 1 is manufactured, positioning pins 12*a* and 12*b* as shown in FIGS. 1 and 3 are inserted to each of the pin inserting holes 10*a* and 10*b*, the pin piercing holes Sa and Sb and the adhesive holes Ma and Mb in a condition that the fixing plate 14 is arranged so that a reinforcement layer 16 may counter the end surface of the holder 10. For example, the positioning pins 12*a* and 12*b* are made of metal such as stainless steel or ceramics such as alumina and have a diameter of about 1 mm. Since the positioning pins are inserted into the pin inserting holes 10*a*, 10*b*, Sa and Sb from the larger size ends, the insertion work is easy. As described in the above, in a condition that the positioning pins 12*a* and 12*b* are inserted, the fixing plate 14 and the holder 10 are in positioned condition, and the fixing plate 14 is attached (fixed) to the holder 10 on the reinforcement layer 16 side by adhering in a positioned condition. Also, the positioning pins 12*a* and 12*b* are fixed to the holder 14 with adhesive in the adhesive holes Ma and Mb in the manner similar to optical fiber adhering as will be later described with FIG. 5. As a result, the fixing plate can be precisely aligned with the holder 10 in such a manner that each fixing hole communicates with the corresponding holding hole.

In the condition that the positioning pins 12*a* and 12*b* are fixed to the fixing plate 14 and the fixing plate is fixed to the holder 10, as shown in FIG. 2, optical fibers $F_{11}$, $F_{21}$, $F_{31}$ and $F_{41}$ are inserted from the another end surface of the holder 10 into a communication hole of the holding hole $H_{11}$, the piercing hole $U_{11}$, the fixing hole $S_{11}$ and the adhesive hole $M_{11}$, a communication hole of the holding hole $H_{21}$, the piercing hole $U_{21}$, the fixing hole $S_{21}$ and the adhesive hole $M_{21}$, a communication hole of the holding hole $H_{31}$, the piercing hole $U_{31}$, the fixing hole $S_{31}$ and the adhesive hole $M_{31}$, and a communication hole of the holding hole $H_{41}$, the piercing hole $U_{41}$, the fixing hole $S_{41}$ and the adhesive hole $M_{41}$. Other optical fibers are inserted also into other communication holes of the other holding holes, piercing holes, fixing holes and adhesive holes. Since the optical fiber is piercing into the holding hole and fixing hole from the larger size ends, the insertion work is easy. Each optical fiber is adhered and fixed to the fixing plate 14 with adhesive in the adhesive hole.

Figure 5:
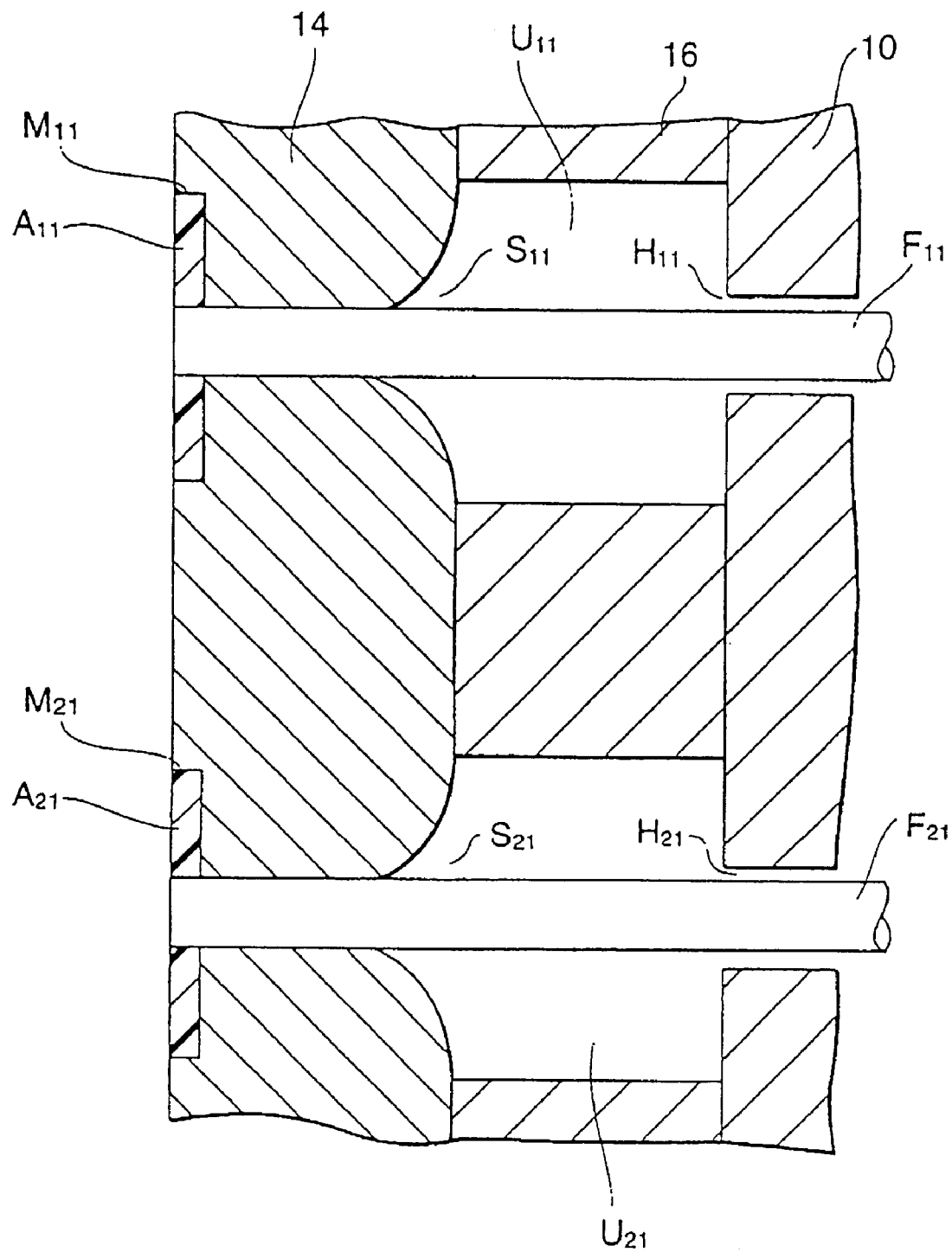
FIG. 5 is an enlarged cross sectional view showing the optical fiber adhesive part.

FIG. 5 shows the adhesion/fixation structure near the adhesive holes $M_{11}$ and $M_{21}$. The optical fiber $F_{11}$ is pierced into the holding hole $H_{11}$, the piercing hole $U_{11}$, the fixing hole $S_{11}$ and the adhesive hole $M_{11}$, and the optical fiber $F_{21}$ is pierced into the holding hole $H_{21}$, the piercing hole $U_{21}$, the fixing hole $S_{21}$ and the adhesive hole $M_{21}$. Then adhesive is filled in the adhesive holes $M_{11}$ and $M_{21}$, and adhesive layers $A_{11}$ and $A_{21}$. Then the optical fibers $F_{11}$ and $F_{21}$ are fixed to the fixing plate 14 by hardening the adhesive layers $A_{11}$ and $A_{21}$.

Thereafter, the optical fibers protruding out of the front surface of the fixing plate 14 are cut. Then the cut surfaces are polished to make the front surface of the fixing plate 14 planar by removing remaining part after cutting of the optical fiber such as $F_{11}$ and projected part of the adhesive layer such as $A_{11}$. By doing this, coupling loss can be decreased at a time of coupling with other optical device.

Moreover, as a polishing process, a slant polishing process may be used if necessary. Also, as an optical fiber fixing means, as described before about the conventional technique, the method for fixing each optical fiber such as $F_{11}$ to the fixing plate 14 by plating metal may be used.

Figure 6:
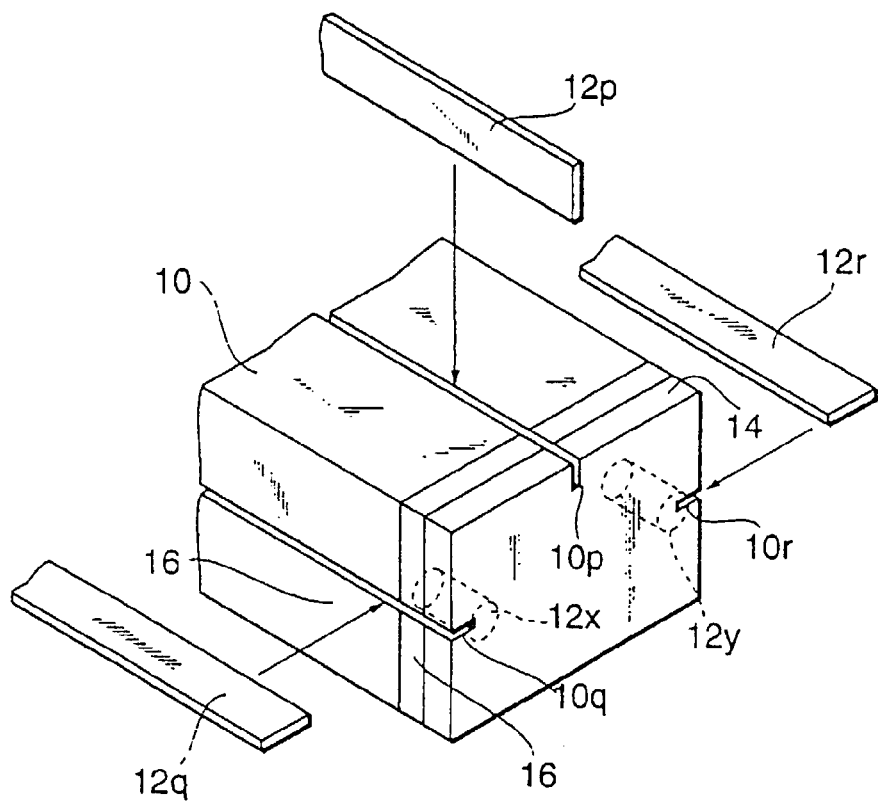
FIG. 6 is a perspective view showing a modified example of positioning method of a holder and a fixing plate.

FIG. 6 illustrates a modified example of positioning method of the holder and fixing plate. In FIG. 6, like elements to those shown in FIGS. 1 to 3 are represented by using identical reference symbols and the description thereof is omitted.

In the example shown in FIG. 6, positioning pin inserting grooves 10*p*, 10*q* and 10*r* are formed extending from one end toward the opposing end (or extending from one end and reaching the opposing end) on the top and both sides of the holder 10. The pin inserting grooves 10*p* to 10*r* extend from the front surface of the fixing plate 14 toward the opposing end of the holder 10 via each edge of the fixing plate 14 and the reinforcement layer 16.

At a time of positioning, plate-shaped positioning pins 12*p*, 12*q* and 12*r* are inserted into the pin inserting grooves 10*p*, 10*q* and 10*r* as indicated by arrows in FIG. 6 in a condition which has arranged the fixing plate 14 so that a reinforcement layer 16 may contact the end surface of the holder 10 as shown in FIG. 6, and fixed to the holder 10 and the fixing plate 14 with adhesive. In this case, the fixing plate 14 is fixed to the holder 10 by adhesive of each positioning pins. In this fixed condition, an optical fiber insertion work similar to that described before is performed. In the positioning pins 12*p* to 12*r*, the positioning pins protruded from the holder 10, the fixing plate 14 and the reinforcement layer 16 can be removed by a polishing process or the like.

Further, in this specification, the term "a (positioning) pin inserting hole" hereinafter includes a pin inserting groove for convenience of the explanation.

As another positioning method, positioning pins 12*x* and 12*y* projecting from one end surface of the holder 10 are integratedly formed in the holder 10 in advance as indicated by broken lines in FIG. 6, and the positioning pins 12*x* and 12*y* may be pierced into each of the pin piercing holes Ua and Ub, the fixing holes Sa and Sb, and adhesive holes Ma and Mb on the fixing plate 14 and the reinforcement layer 16 as shown in FIG. 3. In this pierced condition, the fixing plate 14 is adhered and fixed to the positioning pins 12*x* and 12*y* (that is, the holder 10) in the adhesive holes Ma and Mb with the adhesive. According to this method, work for piercing the positioning pin into the holder 10 can be omitted, and working efficiency improves. Moreover, the above-described polishing process may be executed on the front surface of the fixing plate 14.

In the above-described first embodiment of the present invention, the fixing plates 14 can be set precisely relative to the holder 10 by using the positioning pins 12a and 12b, 12p to 12r or 12x to 12y. Since the fixing plate 14 attaches the reinforcement layer 16 on the attaching surface, they are not likely to be warped or slipped, and throb such as injection and bumping during the polishing process can be prevented. Moreover, the precision of the diameter of each fixing hole of the fixing plate relative to the diameter of an optical fiber is 1 μm or smaller. Therefore, the positioning method at the end of the optical fiber can be set at high precision.

FIGS. 7 to 13 show examples of a method for manufacturing the optical fiber fixing plate.

Figure 7:
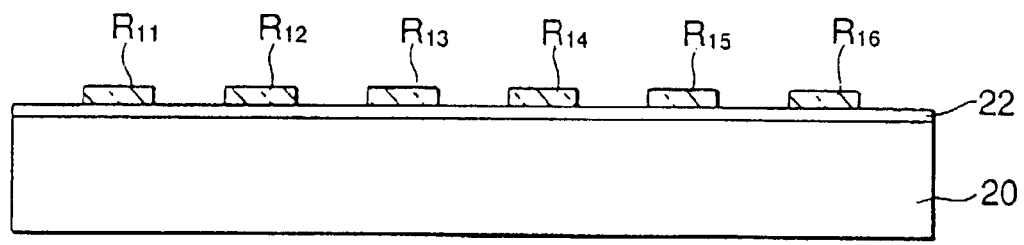
FIG. 7 is a cross sectional view showing a resist layer forming process in an example of a method of manufacturing an optical fiber fixing plate according to the present invention.

In the process shown in FIG. 7, on one main surface of a substrate 20 made of glass, quartz or the like, a Cu/Cr laminating layer (laminating layer laminated Cu layer on Cr layer) 22 as a plating base layer is formed by sputtering. The Cr layer is formed for improving adhesion of Cu layer with the substrate 20. The thickness of the Cr layer or Cu layer is about 20 nm and 200 nm. After forming the Cu/Cr laminating layer, resist layers (negative resist) $R_{11}$ to $R_{16}$ corresponding to desired adhesive hole patterns are formed on the Cu/Cr laminating layer 22 by photolithography.

Figure 8:
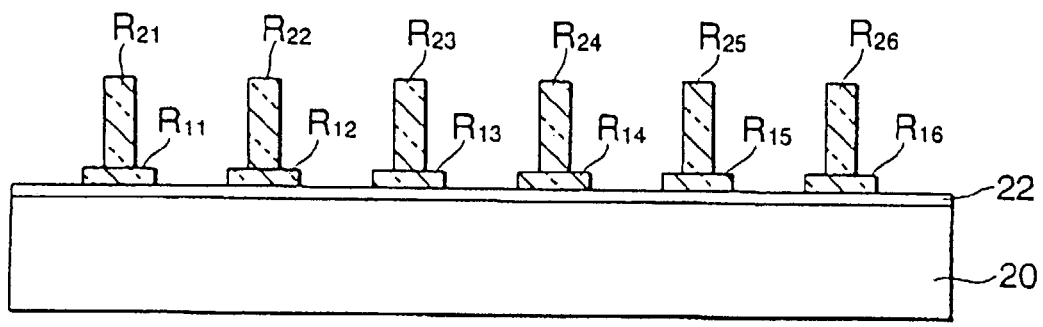
FIG. 8 is a cross sectional view showing a resist layer forming process after the process shown in FIG. 7.

In the process shown in FIG. 8, resist (negative resist patterns) layers $R_{21}$ to $R_{26}$ corresponding to each desired fixing pattern are formed on the resist layers $R_{11}$ to $R_{16}$ by photolithography.

Figure 9:
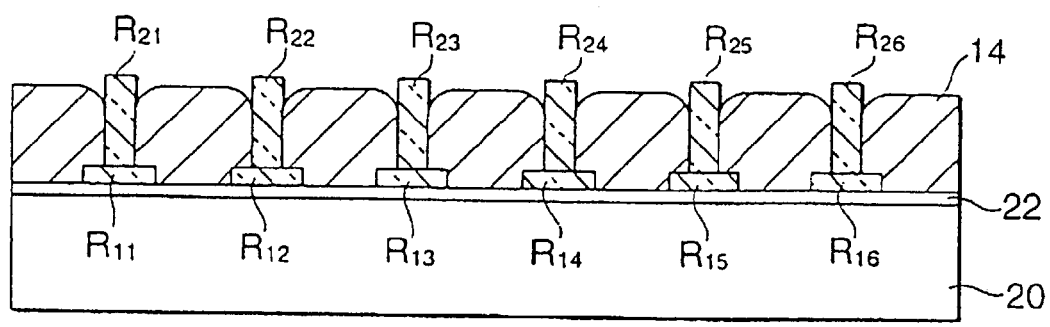
FIG. 9 is a cross sectional view showing a selective plating process after the process shown in FIG. 8.

In the process shown in FIG. 9, by using the resist layer $R_{11}$ to $R_{16}$ and $R_{21}$ to $R_{26}$ as masks, a selective plating process using Ni—Fe alloy is performed to form the optical fiber fixing plate 14. At this time, the fixing plate 14 is formed spaced apart from each resist pattern at the upper peripheral area of each of the resist layers such as $R_{21}$ (the fixing hole increases its size upward).

Figure 14:
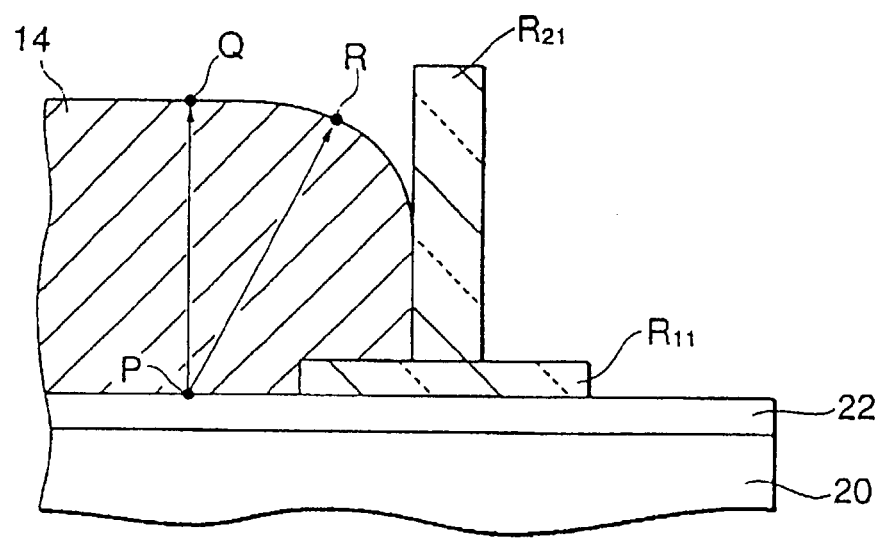
FIG. 14 is a cross sectional view showing the growing condition of a plated layer by the selective plating process.

FIG. 14 illustratively shows a growth condition of the plated layer 14 relative to the resist layers $R_{11}$ and $R_{21}$. Points Q and R on the surface of the plated layer 14 are an equidistance as viewed from a point P on the Cu/Cr laminating layer 22 near the resist layer $R_{11}$. Since the plated layer 14 was grown isotropically, the plated layer 14 grows from the point P overriding the resist $R_{11}$ under the point R where the resist pattern $R_{11}$ exists and the plating base layer is not exposed. Therefore, the plated layer (fixing plate) 14 is formed spaced apart from each resist pattern at the upper circumferential area of the pattern.

Figure 10:
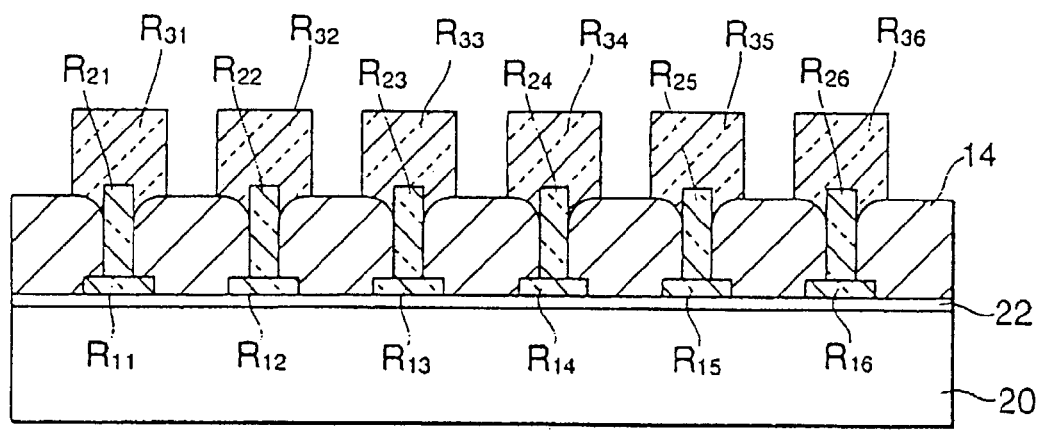
FIG. 10 is a cross sectional view showing a resist layer forming process after the process shown in FIG. 9.

In the process shown in FIG. 10, resist patterns $R_{31}$ to $R_{36}$ corresponding to optical fiber piercing hole patterns are formed on the fixing plate 14 by photolithography. At this time, the resist layers $R_{31}$ to $R_{36}$ are formed with covering the resist layers $R_{21}$ to $R_{26}$.

Figure 11:
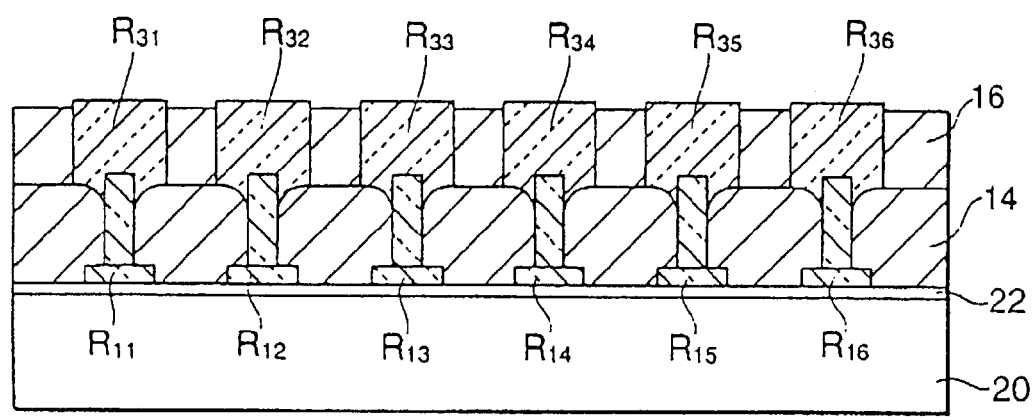
FIG. 11 is a cross sectional view showing a selective plating process after the process shown in FIG. 10.

In the process shown in FIG. 11, by using the resist layers $R_{31}$ to $R_{36}$ as masks, a selective plating process of Ni—Fe alloy is performed to form a reinforcement layer 16 made of a Ni—Fe alloy layer.

Figure 12:
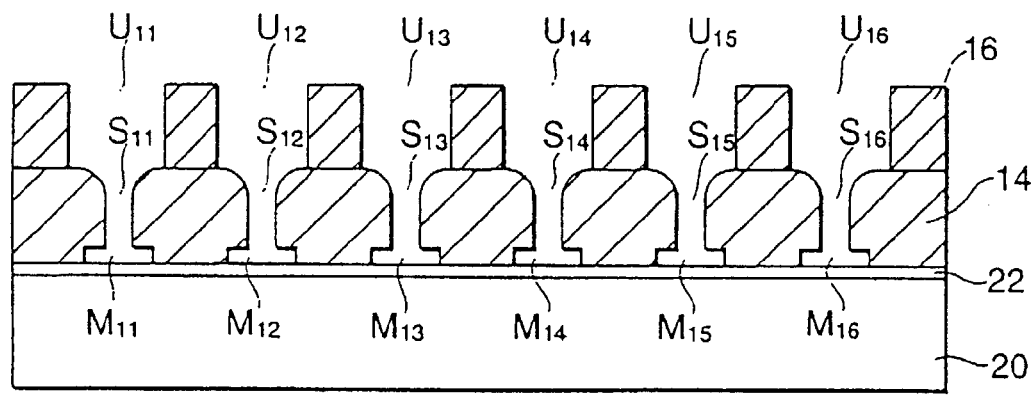
FIG. 12 is a cross sectional view showing a resist layer removing process after the process shown in FIG. 11.

In the process shown in FIG. 12, the resist layers $R_{11}$ to $R_{16}$ and $R_{21}$ to $R_{26}$ are removed by a chemical process or the like. The fixing holes $S_{11}$ to $S_{16}$ and the adhesive holes $M_{11}$ to $M_{16}$ are made on the fixing plate 14, and the optical fiber piercing holes $U_{11}$ to $U_{16}$ are made on the reinforcement layer 16. As a result, in the fixing plate 14, the fixing holes $S_{11}$ to $S_{16}$ are formed piercing and increasing its size from one main surface to another main surface, and adhesive holes $M_{11}$ to $M_{16}$ are formed on one main surface of the fixing plate 14 to be continuous with the smaller size ends of the fixing holes $S_{11}$ to $S_{16}$. Also, adhesive holes $M_{11}$ and $M_{16}$ are formed on one main surface of the fixing plate 14 to be continuous with the smaller size ends of the fixing holes $S_{11}$ to $S_{16}$. Also, optical fiber piercing holes $U_{11}$ to $U_{16}$ are formed on one main surface of the fixing plate 14 to be continuous with the smaller size ends of the fixing holes $S_{11}$ to $S_{16}$.

Figure 13:
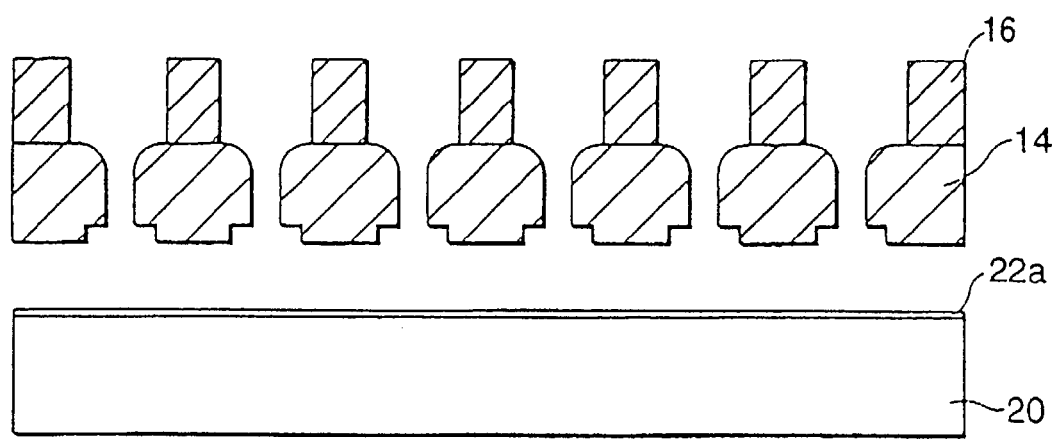
FIG. 13 is a cross sectional view showing a substrate separating process after the process shown in FIG. 12.

In the process shown in FIG. 13, the Cu layer of the Cu/Cr laminating layer 22 by etching to split the fixing plate 14 having the reinforcement layer 16 from the substrate 20. The Cr layer 22a is remained on the substrate 20.

Figure 15:
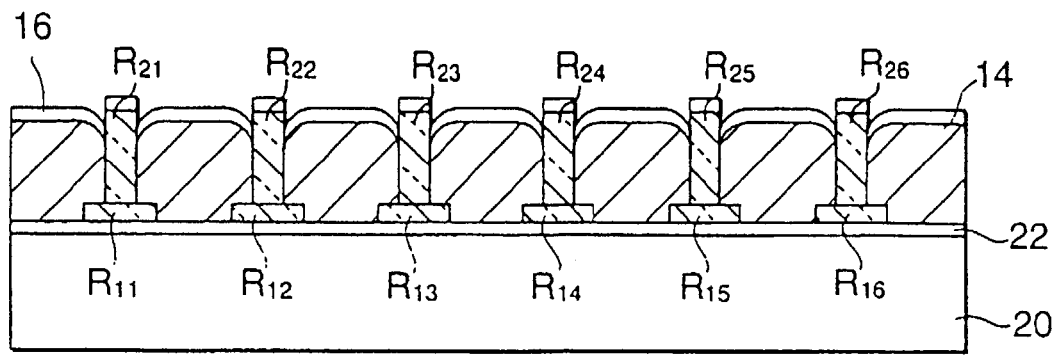
FIG. 15 is a cross sectional view showing a sputtering process in another example of the method of manufacturing an optical fiber fixing plate according to the present invention.
Figure 16:
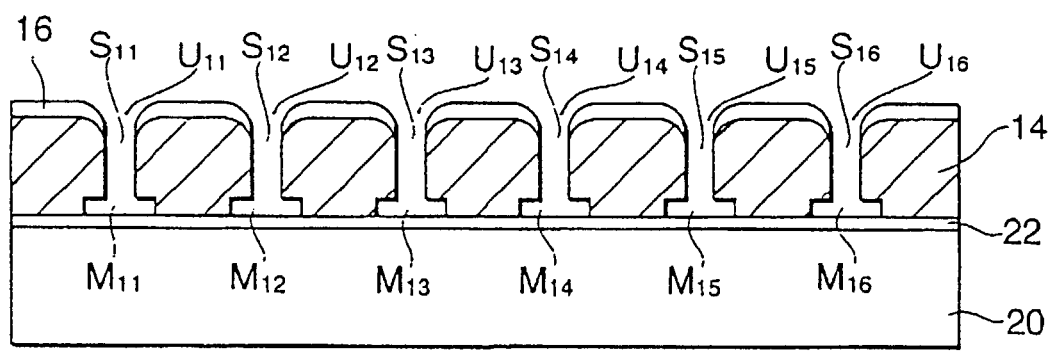
FIG. 16 is a cross sectional view showing a resist layer removing process after the process shown in FIG. 15.
Figure 17:
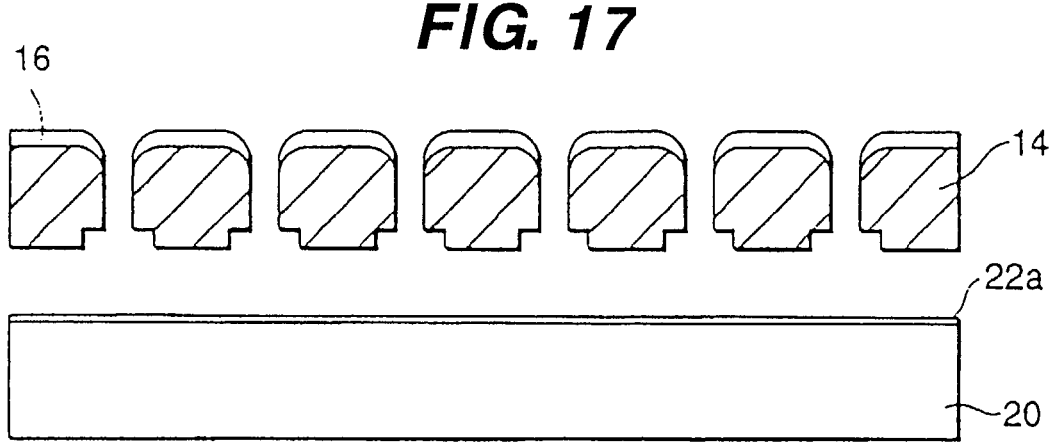
FIG. 17 is a cross sectional view showing a substrate separating process after the process shown in FIG. 16.

An insulating material layer such as a silicon oxide or an aluminum oxide (alumina) may be formed as the reinforcement layer 16 for reinforcing the fixing plate 14 by using lift-off method instead of selective plating method. For example, the reinforcement layer 16 made of insulating material is formed as shown in FIGS. 15 to 17. In FIGS. 15 to 17, like elements to those shown in FIGS. 7 to 13 are represented by identical reference symbols and the description thereof is omitted.

In the process shown in FIG. 15, the silicon oxide ($SiO_2$) is attached on the fixing plate 14 and the resist layers $R_{21}$ to $R_{26}$ after the selective plating process shown in FIG. 9 by spattering method to form the reinforcement layer 16 made of the attached layer (silicon oxide layer. At this time, thickness of the silicon oxide layer can be 20 nm.

In the process shown in FIG. 16, the resist layers $R_{11}$ to $R_{16}$ and $R_{21}$ to $R_{26}$ and the silicon oxide on the $R_{21}$ to $R_{26}$ are removed by a chemical process or the like, and fixing holes $S_{11}$ to $S_{16}$ and the adhesive holes $M_{11}$ to $M_{16}$ are added on the fixing plate 14. Then the optical fiber piercing holes $U_{11}$ to $U_{16}$ are added on the reinforcement layer 16. As a result, in the fixing plate 14, the fixing holes $S_{11}$ to $S_{16}$ are formed piercing and increasing its size from one main surface to opposite main surface, and adhesive holes $M_{11}$ to $M_{16}$ are formed on one main surface of the fixing plate 14 to be continuous with the smaller size ends of the fixing holes $S_{11}$ to $S_{16}$. Also, adhesive holes $M_{11}$ and $M_{16}$ are formed on one main surface of the fixing plate 14 to be continuous with the smaller size ends of the fixing holes $S_{11}$ to $S_{16}$. Also, in the reinforcement layer 16, the optical fiber piercing holes $U_{11}$ to $U_{16}$ are formed continuously with a corresponding one of the fixing holes $S_{11}$ to $S_{16}$ at its larger size end of the corresponding fixing hole, and each optical fiber piercing hole increases its size toward an outer direction.

In the process shown in FIG. 17, the Cu layer of the Cu/Cr laminating layer 22 by etching to split the fixing plate 14 having the reinforcement layer 16 from the substrate 20. The Cr layer 22a is remained on the substrate 20.

The reinforcement layer made of the silicon oxide layer has an effect reinforcing the fixing plate 14 made of metal. Since the silicon oxide layer is smaller in the coefficient of linear expansion (0.5 ppm) than that of metal, a pitch gap of the optical fiber by temperature change at a time of constituting the optical fiber array and after that can be prevented. Moreover, manufacturing method, materials, thickness and the like of the reinforcement layer 16 can be selected arbitrarily, and a laminating layer can be used for reinforcement layer 16.

As the optical fiber fixing plate 14 shown in FIGS. 1 to 5, one from which omitted adhesive holes such as $M_{22}$, $M_{32}$, $M_{33}$, $M_{11}$ to $M_{41}$, Ma, Mb and the like can be used. In this case, the fixing plate 14 is constituted as shown in FIGS. 18 to 22.

Figure 18:
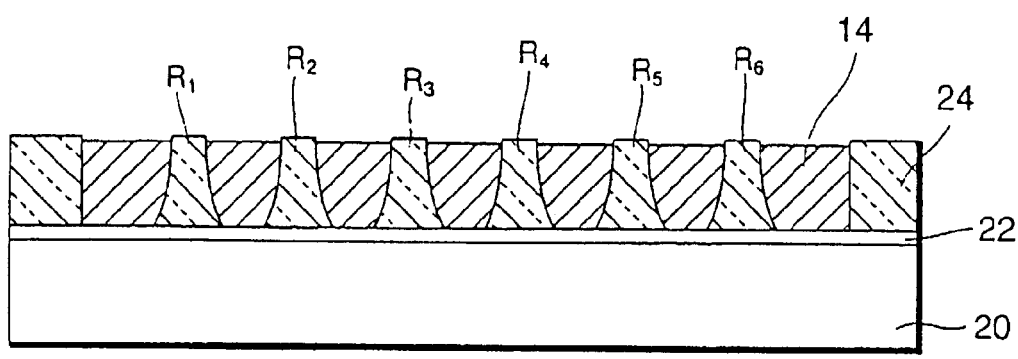
FIG. 18 is a cross sectional view showing a selective plating process in further another example of the method of manufacturing an optical fiber fixing plate according to the present invention.

In the process shown in FIG. 18, after forming Cu/Cr layer 22 on the surface of the substrate 20 as described before about FIG. 7, resist layers 24 and $R_1$ to $R_6$ are formed on the Cu/Cr lamination layer 22. The resist layer 24 has a quadrilateral hole corresponding to the plan pattern of the desired fixing plate. The resist layers $R_1$ to $R_6$ have patterns corresponding to the desired fixing holes to be formed in the quadrilateral hole. Each of the resist layers $R_1$ to $R_6$ has a shape increasing its size downward. In order to form the normal taper resist shape such as the resist layers $R_1$ to $R_6$, one of the following methods is adopted by using a stepper (a reduction projection aligner):

(a) a method for setting the focal point in the resist layer;
(b) a method for setting an exposure amount smaller at the lower region of the resist layer, and
(c) a method for gradually changing a transmission factor of an exposure mask (increasing the transmission factor higher at a lower position in the skirt of the resist pattern).

After forming the resist layers R1 to R6, by using the resist layers 24 and R1 to R6 as masks, a selective plating process of Ni—Fe alloy is performed to form a fixing plate 14 made of a Ni—Fe alloy layer.

Figure 19:
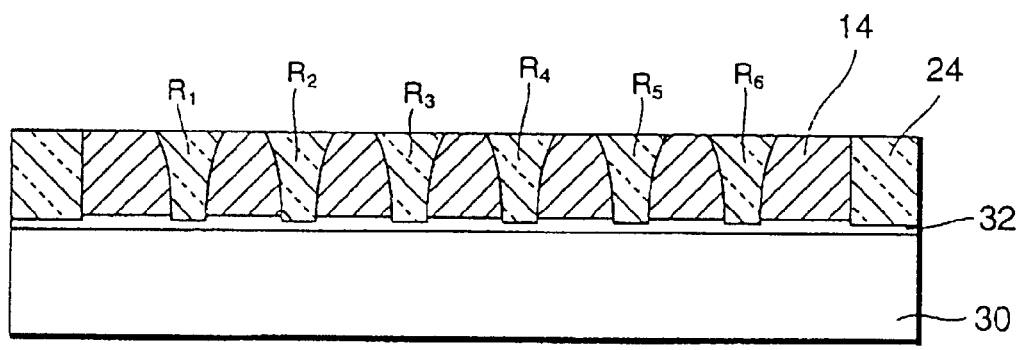
FIG. 19 is a cross sectional view showing a substrate exchanging process after the process shown in FIG. 18.

In the process shown in FIG. 19, in the fixing plate 14 and the resist layers R1 to R6 and 24, a substrate 30 made of glass, quartz or the like is stuck on a surface where is opposite from the substrate 20 side via the adhesive layer. Then the Cu layer of the Cu/Cr lamination layer 22 is removed by etching to split the substrate 20 from the fixing plate 14 held by the substrate 30 and the resist layers R1 to R6. FIG. 19 shows the substrate 30 in a condition that the fixing plate 14 and the resist layers R1 to R6 are above the substrate 30. A resin substrate that can exfoliate may be used for the substrate 30.

Figure 20:
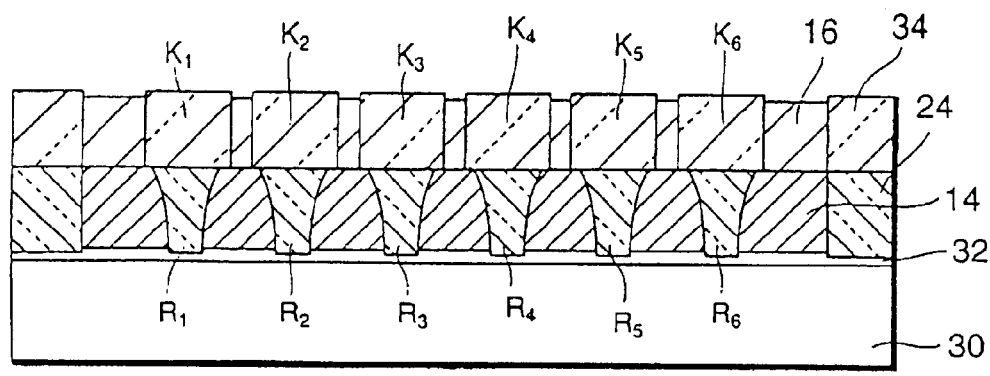
FIG. 20 is a cross sectional view showing a selective plating process after the process shown in FIG. 19.

In the process shown in FIG. 20, resist layers K1 to K6 and 34 are formed on the fixing plate 14 and the resist layers R1 to R6 and 24. The resist layer 34 has a quadrilateral hole as same as the resist layer 24. The resist layers K1 to K6 have patterns corresponding to the desired optical fiber piercing hole and cover the resist layers R1 to R6 to be formed in the quadrilateral hole. Then by using the resist layers K1 to K6 and 34 as masks, a selective plating process of Ni—Fe alloy is performed to form a reinforcement layer 16 made of a Ni—Fe alloy layer.

Figure 21:
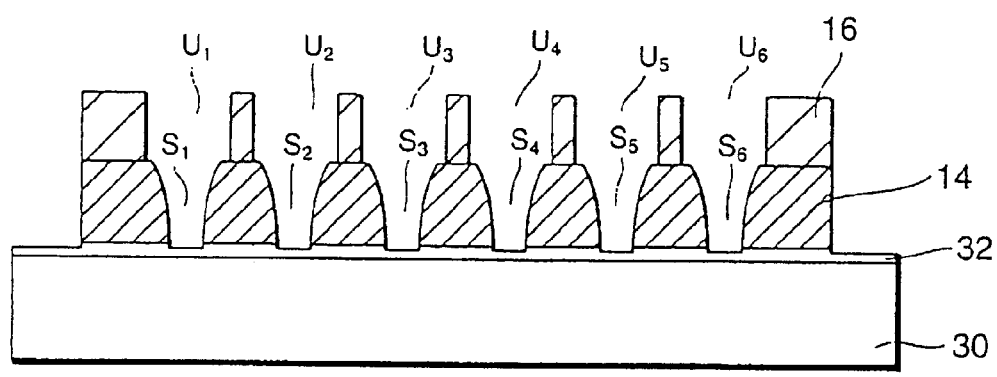
FIG. 21 is a cross sectional view showing a resist layer removing process after the process shown in FIG. 20.
Figure 22:
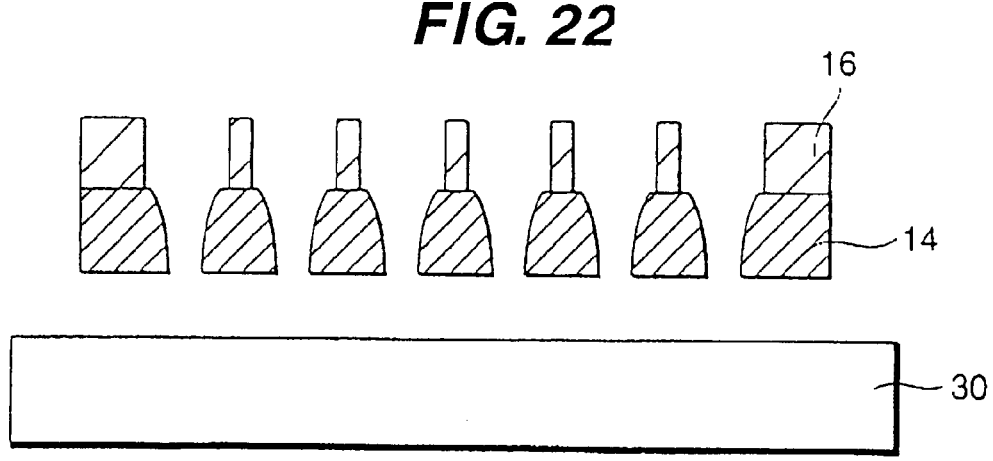
FIG. 22 is a cross sectional view showing a substrate separating process after the process shown in FIG. 21.

In the process shown in FIG. 21, the resist layers K1 to K6, 34, R1 to R6 and 24 are removed by a chemical process or the like. As the resist layers R1 to R6 are removed, fixing holes S1 to S6 are formed in the fixing plate 14. Each fixing hole increases its size downward the resist layers in FIG. 18. Since the upper and lower sides are made upside down in the process in FIG. 19, each fixing hole in the fixing plate 14 increases its size upward the resist layers. Optical fiber piercing holes U1 to U6 are formed continuously at its larger size end of the fixing holes S1 to S6, and have the size larger than the smaller size end. After that, the adhesive layer 32 is removed by a chemical process or the like to split the fixing plate 14 having the reinforcement layer 16 from the substrate 30.

According to the above-described optical fiber fixing plate manufacturing method, the position and size of each of the optical fiber fixing holes S11 to S16, M11 to M16 and S1 to S6 and the optical fiber fixing hole pitch can be set at a submicron precision such as 0.5 μm. However, the examples show one dimensional arrangement of holes S11 to S16, M11 to M16 and S1 to S6 as the fixing plate 14, those fixing holes and the adhesive holes may be formed in a two-dimensional arrangement by the same process as those described in the above. Moreover, the pin inserting holes Sa and Sb and the adhesive holes Ma and Mb shown in FIG. 3 can also be made as same as the fixing holes S11 to S16 and the adhesive holes M11 to M16, and the pin inserting holes Sa and Sb can be made without the adhesive holes as same as the fixing holes S1 to S6 if necessary.

Figure 23:
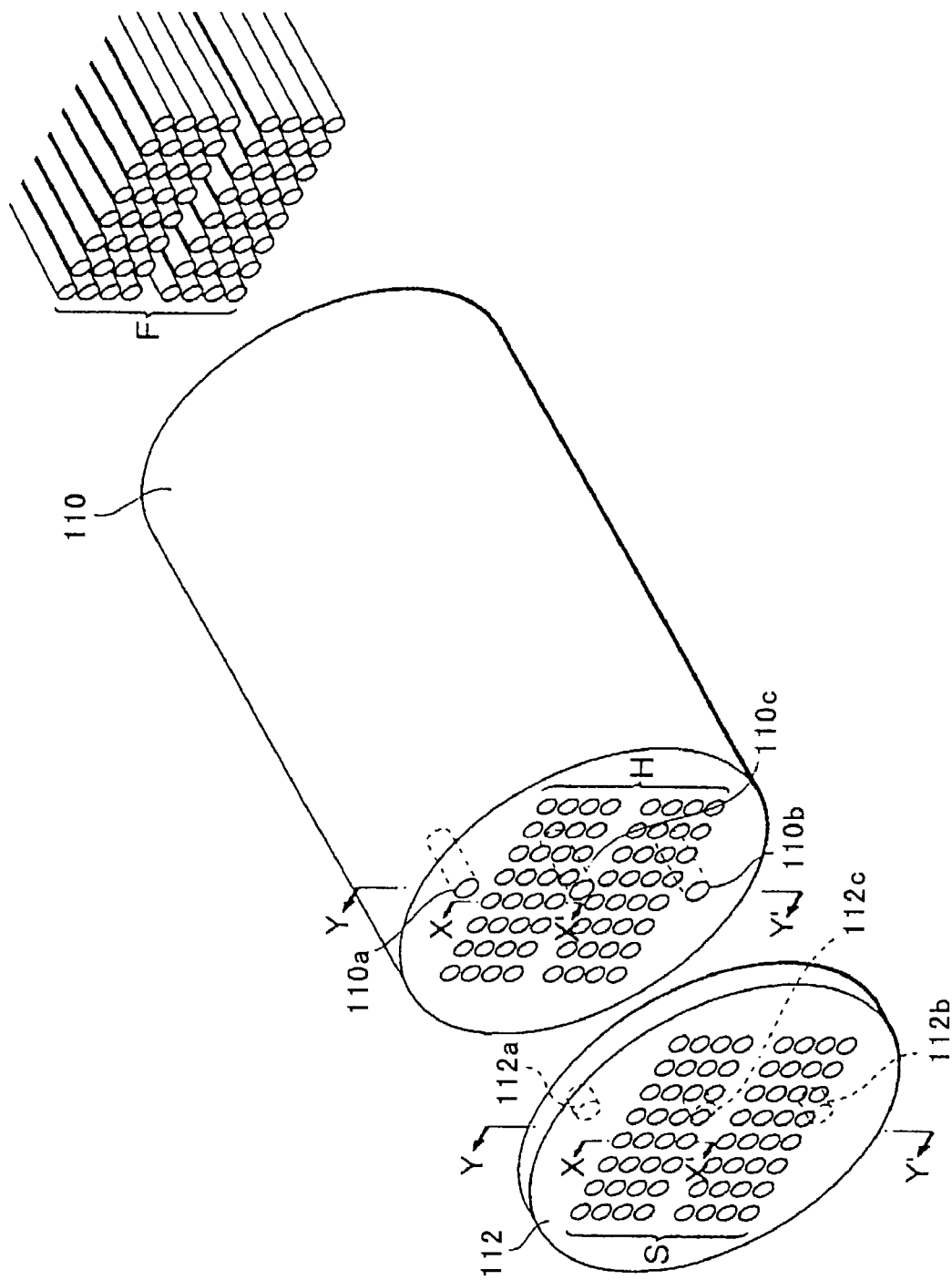
FIG. 23 is a perspective view showing a condition before a two-dimensional optical fiber array according to a second embodiment of the present invention is assembled.
Figure 24:
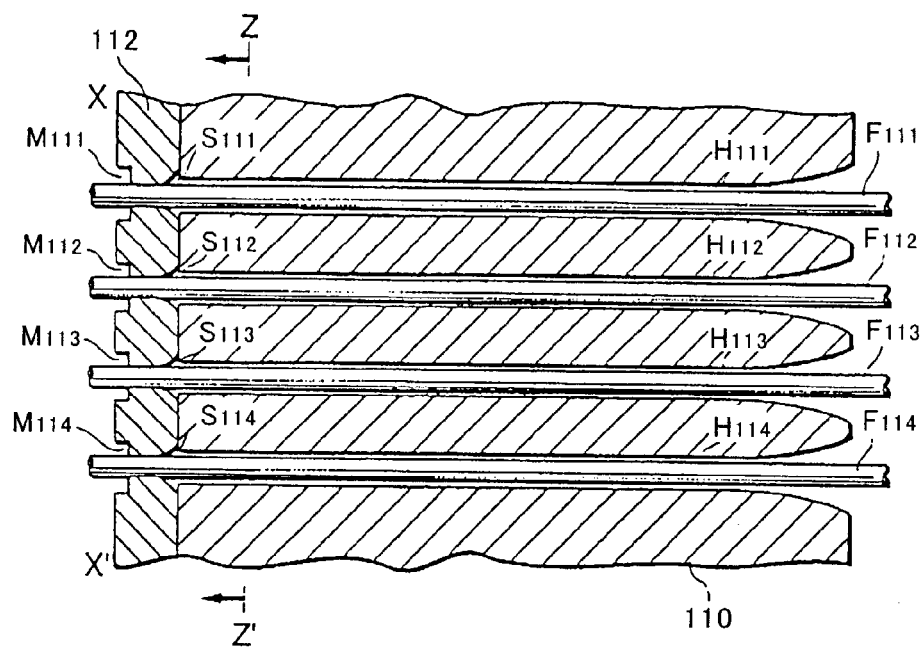
FIG. 24 is a cross sectional view showing a condition after the optical fiber array is assembled taken along line X–X' shown in FIG. 23.

FIG. 23 shows a condition before a two-dimensional optical fiber array according to a second embodiment of the present invention is assembled. A cross sectional view of a condition after the optical fiber array is assembled taken along line X–X' shown in FIG. 23 is shown in FIG. 24, and a cross sectional view of a condition after the optical fiber array is assembled taken along line Y–Y' shown in FIG. 23 is shown in FIG. 25.

The optical fiber holder 110 is made of ceramic (for example, zirconium), alumina, quartz or the likes and is also called ferrule. The optical fiber holder 110 is, for example, in a column shape, and the diameter of the holder 110 can be set to about 6 mm for example.

A holding hole group H including a large number of optical fiber holding holes corresponding to each of a large number (for example, 64) of optical fibers (optical fiber core lines) of an optical fiber group F is provided. A large number of the optical fiber holding holes of an optical fiber holding hole group H extends in the holder 110 substantially in parallel and their openings are arranged in matrix on one end surface of the holder 110. A pitch P (refer to FIG. 27) between adjacent optical fiber holding holes can be set to 0.25 mm. As shown in FIG. 24, the optical fiber holding holes $H_{111}$ to $H_{114}$ of the optical fiber holding hole group H pierce from one end surface to another end surface of the holder 110, and the size (diameter) of each holding hole becomes larger from the one end surface toward another end surface of the holder 110. Each of the optical fibers $F_{111}$ to $F_{114}$ can be pierced into the optical fiber holding holes $H_{111}$ to $H_{114}$. The optical fiber holding holes $H_{111}$ to $H_{114}$ of the optical fiber holding hole group H have the same structure of holes as in the structure described in the above. The size of each holding hole becomes larger from one end surface toward another end surface of the holder 110 because it makes easy to insert an optical fiber into the corresponding hole.

Figure 25:
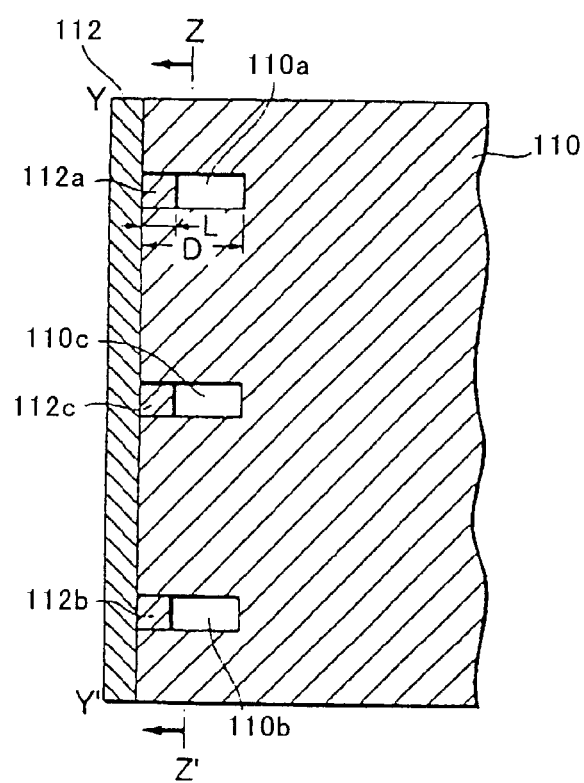
FIG. 25 is a cross sectional view showing a condition after the optical fiber array is assembled taken along line Y–Y' shown in FIG. 23.

On the one end surface of the holder 110, as shown in FIG. 23 and FIG. 25, positioning pin inserting holes 110a to 110c are formed. The positioning pin inserting hole 110c of 110a to 110c is a central hole, and an external shape of the holder 110 is processed on the basis of the central hole 110c. An external size precision can be set to 0.5 μm or less, and eccentricity precision of the central hole 110c to the external shape can also be set to ±0.5 μm or less. The diameter and the length of each pin inserting hole such as 110a can be set to 1 mm in the diameter and 3 mm in the length.

The optical fiber fixing plate 112 has a circular shape corresponding to a shape of the one end surface of the holder 110, for example, is consisted of metal such as Ni—Fe alloy and the like in thickness of about 50 μm. An optical fiber fixing hole group S including a large number of the optical fiber fixing holes corresponding to each of the large number of the optical fiber holding holes of the holding hole group H is provided on the fixing plate 112. A large number of the optical fiber fixing holes of the fixing hole group S are arranged in matrix, and a pitch between adjacent optical fiber fixing holes can be set to 0.25 mm as same as that of the optical fiber holding holes.

The optical fiber fixing holes $S_{111}$ to $S_{114}$ of the fixing hole group S are arranged to be piercing from one main surface to another main surface of the fixing plate 112, and the size (diameter) of the fixing holes become larger from the one main surface toward the another main surface of the fixing plate 112 in order to make it easy to insert an optical fiber. The optical fiber $F_{111}$ to $F_{114}$ can be inserted into the fixing holes $S_{111}$ to $S_{114}$. The optical fiber fixing holes $S_{111}$ to $S_{114}$ of the optical fiber fixing hole group S have the same hole structure as holes described in the above. The size of each fixing hole becomes larger from one end surface toward another end surface of the fixing plate 112 because it makes it easy to insert an optical fiber into the corresponding optical fiber fixing hole.

As shown in FIG. 24, adhering holes $M_{111}$ to $M_{114}$ are formed on the one main surface of the fixing plate 112 to be continuous with the smaller size (diameter) opening ends of the fixing holes $S_{111}$ to $S_{114}$. The adhering holes $M_{111}$ to $M_{114}$ have a diameter larger than the corresponding fixing holes. Also, the same adhering holes are formed on other fixing holes other than $S_{111}$ to $S_{114}$. Each adhering hole such as $M_{111}$ or the like is used for adhering and fixing the optical fiber to the fixing plate 112. Moreover, in FIG. 23, drawing of each adhering hole such as $M_{111}$ or the like is omitted for a convenience of the explanation.

On the another main surface of the fixing plate 112, positioning pins 112a, 112b and 112c to be inserted into each of the pin inserting holes 110a, 110b and 110c of the holder 110 are provided, and each positioning pin is, for example, a column shape. The length L of each positioning pin such as 112a or the like is smaller than the depth D of each pin inserting hole such as 110a as shown in FIG. 25. That is, in the second embodiment of the present invention, the depth D of each pin inserting hole such as 110a and the like set to be deeper than the length L of each positioning pin such as 112a or the like as described later in FIG. 27. When a polishing process is executed on the one end surface of the holder 110, a portion of the pin inserting hole such as 110a or the like is remained, and the remaining part is used as a guide pin inserting hole. When the remaining part of the pin inserting hole such as 110a and the like is not used, the depth D of the pin inserting hole such as 110a and the like may approximately be same as the length L of the positioning pin.

When the optical fiber array shown in FIG. 23 is assembled, the positioning pins 112a to 112c of the fixing plate 112 are inserted into the pin inserting holes 110a to 110c of the holder 110 to attach the fixing plate 112 to one end surface of the holder 110 as shown in FIG. 25. When fixing by the inserting process is insufficient, the fixing plate f2 may be adhered with the holder 110 by using adhesive. By attaching (fixing) the fixing plate 112 to one end surface of the holder 110, the fixing plate 112 becomes positioned to the holder 110, and each fixing hole of the fixing plate 112 is positioned so that it is connected continuously with the holding hole corresponding to the holder 110.

In this position alignment condition, as shown in FIG. 24, the optical fibers $F_{111}$, $F_{112}$, $F_{113}$ and $F_{114}$ are inserted from the another end surface (right side in FIG. 24) of the holder 110 respectively into a connected hole of the holding hole $J_{111}$, the fixing hole $S_{111}$ and the adhesive hole $M_{111}$, a connected hole of the holding hole $J_{112}$, the fixing hole $S_{112}$ and the adhesive hole $M_{112}$, a connected hole of the holding hole $J_{113}$, the fixing hole $S_{113}$ and the adhesive hole $M_{113}$, and a connected hole of the holding hole $J_{114}$, the fixing hole $S_{114}$ and the adhesive hole $M_{114}$. Other optical fibers are inserted also into other connected holes of the other holding holes, fixing holes and adhesive holes. Since the optical fiber is inserted into the holding hole and fixing hole from the larger size end, the insertion work is easy. Each optical fiber is adhered and fixed to the fixing plate 112 and the holder 110 being a condition of inserting into the corresponding holding hole, fixing hole and adhesive hole.

Figure 26:
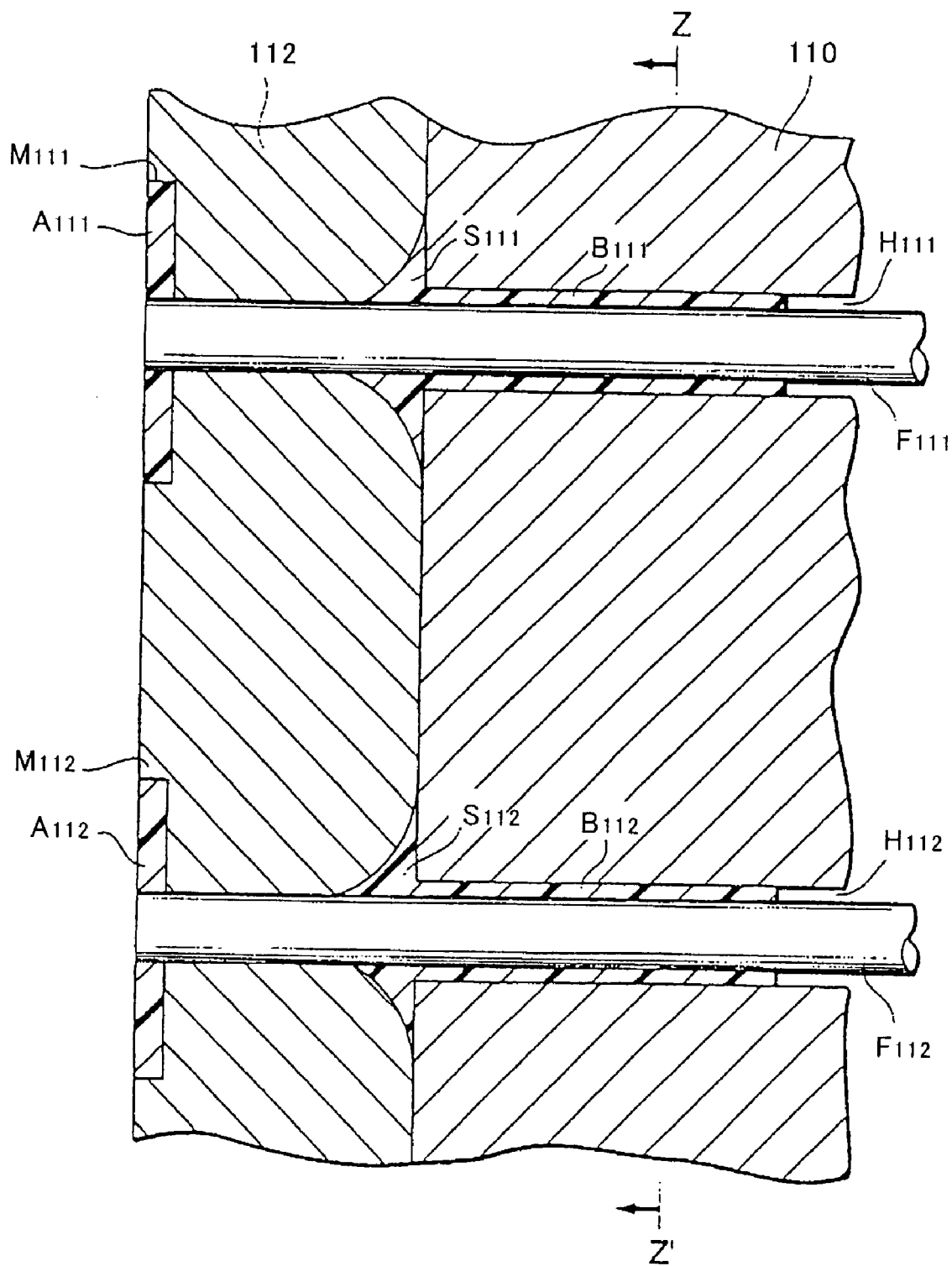
FIG. 26 is an enlarged perspective view showing a part of installed surface of the optical fiber fixing plate.

FIG. 26 shows the adhesion/fixation structure near the optical fibers $F_{111}$ and $F_{112}$. At a time of adhering work, UV (ultraviolet rays) curable adhesive is filled in the fixing holes $S_{111}$ to $S_{114}$ and the adhesive holes $M_{111}$ to $M_{114}$. Then ultraviolet beam is irradiated to the adhesive via the optical fiber $F_{111}$ and $F_{112}$ in a condition of piercing the optical fiber $F_{111}$ and $F_{112}$ into the connected hole of the hole $H_{111}$, $S_{111}$ and $M_{111}$ and the connected hole of the $H_{112}$, $S_{112}$ and $M_{112}$ to cure the adhesive as shown in FIG. 26. As a result, the optical fiber $F_{111}$ is fixed to the fixing plate 112 and the holder 110 by the adhesive layers $A_{111}$ and $B_{111}$ made of the cured adhesive, and the optical fiber $F_{112}$ is fixed to the fixing plate 112 and the holder 110 by the adhesive layers $A_{112}$ and $B_{112}$ made of the cured adhesive.

Thereafter, the optical fibers projecting out of the front surface of the fixing plate 112 are cut off. Then the cut off surfaces are polished to make the front surface of the fixing plate 112 planar by removing remaining parts after cutting of the optical fibers such as $F_{111}$ or the likes and bulging parts of the adhering layer such as $A_{111}$. As doing this, coupling loss can be decreased at a time of coupling the optical fiber array to be assembled with other optical device on the front surface of the fixing plate 112.

In this usage example, each optical fiber may be fixed to the fixing plate by omitting the adhesive holes $M_{111}$ and $M_{112}$ or using plating metal instead of the adhesive. Moreover, as a polishing process, a slant polishing process may be used if necessary.

Figure 27:
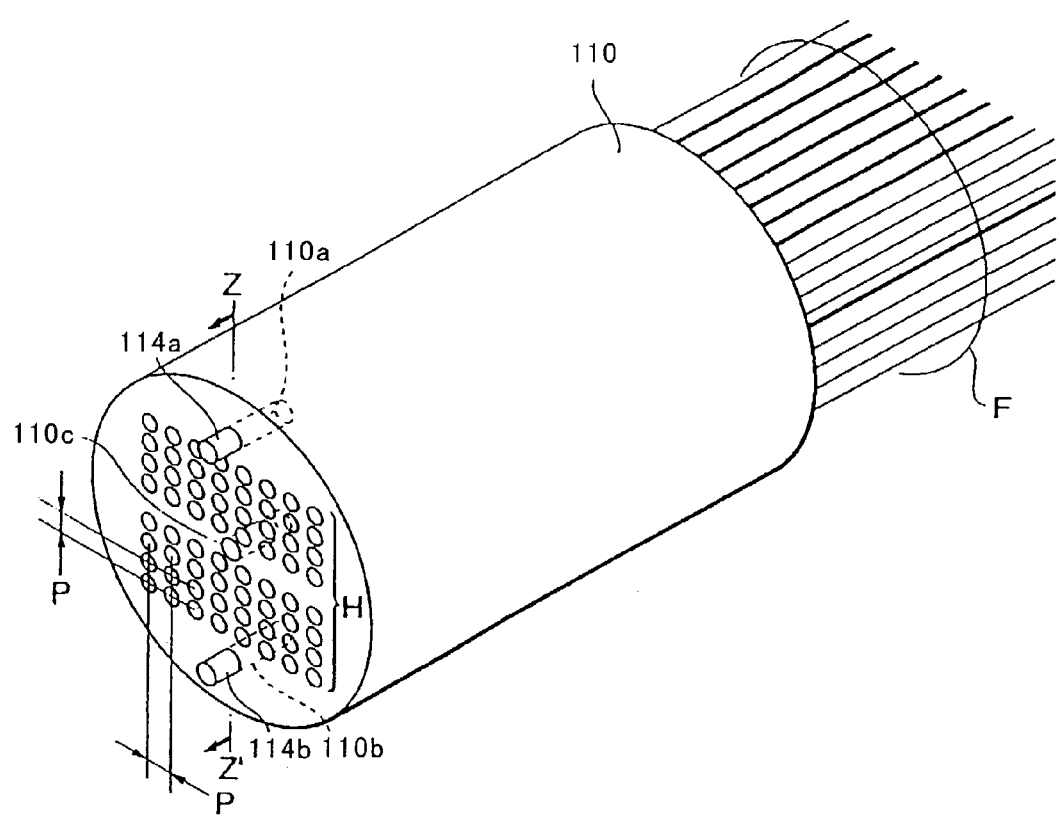
FIG. 27 is a perspective view showing a usage example of the optical fiber adhesive part.

FIG. 27 shows other usage example of the optical fiber adhesive part. In FIG. 27, parts similar to those shown in FIGS. 23 to 26 are indicated by using identical reference symbols and the descriptions thereof are omitted.

In the example shown in FIG. 27, after adhesion and fixation of each optical fiber to the fixing plate 112 and the holder 110 as shown in FIG. 26, polishing process is executed from Z to Z' line on one end surface of the holder 110 as shown in FIGS. 24 to 26. Thus, the fixing plate 112 and the positioning pin 112a to 112c are removed, and a section the holder 110 near the pins 112a to 112c is removed. Then the removed surface is planarized. The position of Z to Z' line is deeper than the position of a tip of each pin such as 112a and the like and shallower than a bottom of each pin inserting hole such as 110a and the like. Each optical fiber is fixed at a section of the holder 110 where is deeper than the position of the Z to Z' line by the adhesive layer such as $B_{111}$ and the like. Therefore, the section between Z to Z' line is polished, and each optical fiber is remained being a condition that it is held by the adhesive layer such as $B_{111}$ and the like in the section of the holder 110 where is deeper than the position of the Z to Z' line. Also, a part that is deeper than the position of the Z to Z' line of the pin inserting holes 110a to 110c is remained.

For example, a remaining part of 110a and 110b of the pin inserting holes 110a to 110c is used as guide pin inserting holes. That is, guide pin 114a and 114b are inserted in the remained holes 110a and 110b, and the pins 114a and 114b in a predetermined length from a plane surface corresponding to the position of Z to Z' line are projected in the inserted condition. If one that has pin inserting hole corresponding to the pins 114a and 114b as other optical device (or connector) is prepared, the optical fiber array in the FIG. 27 can be coupled with other optical device (or connector) with less coupling loss by inserting pins 114a and 114b into the pin inserting holes of other optical device (or connector). In this case, concentricity can be achieved by the external shape precision of the holder 110 and positioning in a rotating direction can be achieved by a positioning precision of the pins 114a and 114b.

Moreover, remaining parts of the pin inserting holes 110a and 110c, the pin inserting holes 110b and 110c or the pin inserting holes 110a to 110c may be used as guide pin inserting holes. Also, when other optical device (or connector) that has the guide pin 114a and 114b is used, coupling may be achieved by inserting the guide pin 114a and 114b into the guide pin inserting holes of the holder 110.

According to the above-described second embodiment, the fixing plate 112 is equipped on one end surface of the holder 110 inserting the positioning pins 112a to 112c into the pin inserting holes 110a to 110c. By doing that, the fixing plate 112 can be positioned to the holder 110 precisely. When inserting precision between the positioning pin such as 112a and the pin inserting hole such as 110a is set to ±0.2 μm, and when positioning precision of the fixing hole such as $S_{111}$ to the positioning pin such as 112a is set to ±0.1 μm, positioning precision of the end surface of each optical fiber to the outline of the holder 110 can be set to 1 μm or less. Also, as diameter precision of each fixing hole of the fixing plate 112, precision of 1 μm or less to the outer diameter of the optical fiber can be achieved. Therefore, positioning with high precision of the optical fiber such as $F_{111}$ on one end surface of the holder 110 is possible.

FIGS. 28 to 35 show an example of a method of manufacturing an optical fiber fixing plate according to the second embodiment.

Figure 28:
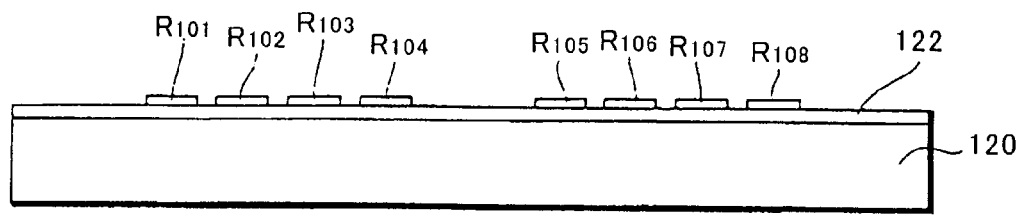
FIG. 28 is a cross sectional view showing a Cu/Cr laminating layer forming process and a resist layer forming process in an example of a method of manufacturing an optical fiber fixing plate according to the present invention.

In the process shown in FIG. 28, on one main surface of a substrate 120 made of glass, quartz or the like, a Cu/Cr laminating layer (laminating layer laminated Cu layer on Cr layer) 122 as a plating base layer is formed by sputtering. The Cr layer is formed for improving adhesion of Cu layer with the substrate 120. The thickness of the Cr layer or Cu layer is about 20 nm and 200 nm. After forming the Cu/Cr laminating layer, resist layers (negative resist) $R_{101}$ to $R_{108}$ corresponding to desired adhesive hole patterns are formed on the Cu/Cr laminating layer 122 by photolithography.

Figure 29:
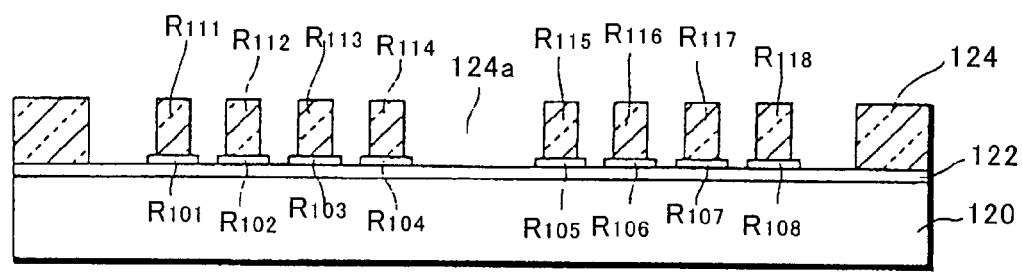
FIG. 29 is a cross sectional view illustrating a resist layer forming process after the process shown in FIG. 28.
Figure 30:
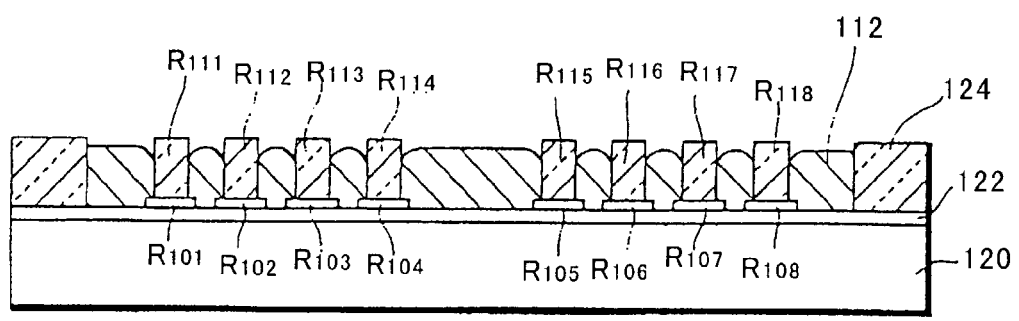
FIG. 30 is a cross sectional view illustrating a selective plating process after the process shown in FIG. 29.

In the process shown in FIG. 29, resist (negative resist) layers 124 and $R_{111}$ to $R_{118}$ are formed by photolithography. The resist layer 124 is formed on the CU/Cr laminating layer having a circular hole 124a corresponding to each desired plane pattern of the fixing plate. The resist layers $R_{111}$ to $R_{118}$ are formed on the resist layers $R_{101}$ to $R_{108}$ having a circular shape corresponding to each desired fixing hole.

Figure 31:
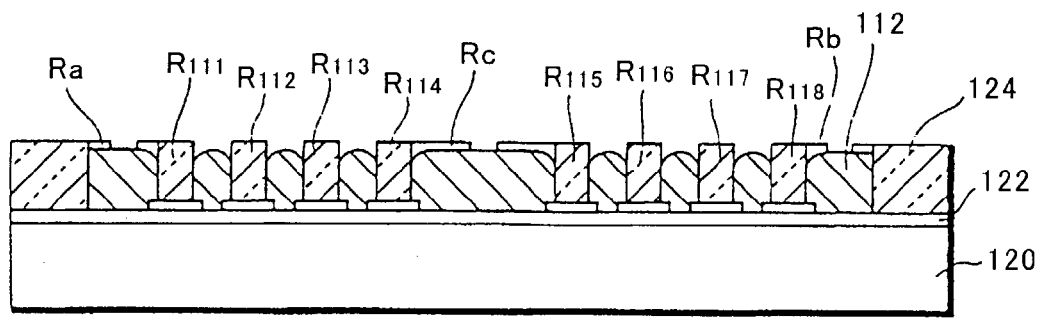
FIG. 31 is a cross sectional view illustrating a resist layer forming process after the process shown in FIG. 30.

In the process shown in FIG. 31, by using the resist layer $R_{101}$ to $R_{108}$, $R_{111}$ to $R_{118}$ and 124 as masks, a selective plating process using Ni—Fe alloy is performed to form the hole forming the optical fiber fixing plate 112. At this time, the fixing plate 112 is formed spaced apart from each resist pattern at the upper circumferential area of each resist layer such as $R_{111}$ (the fixing hole increases its size upward).

Figure 36:
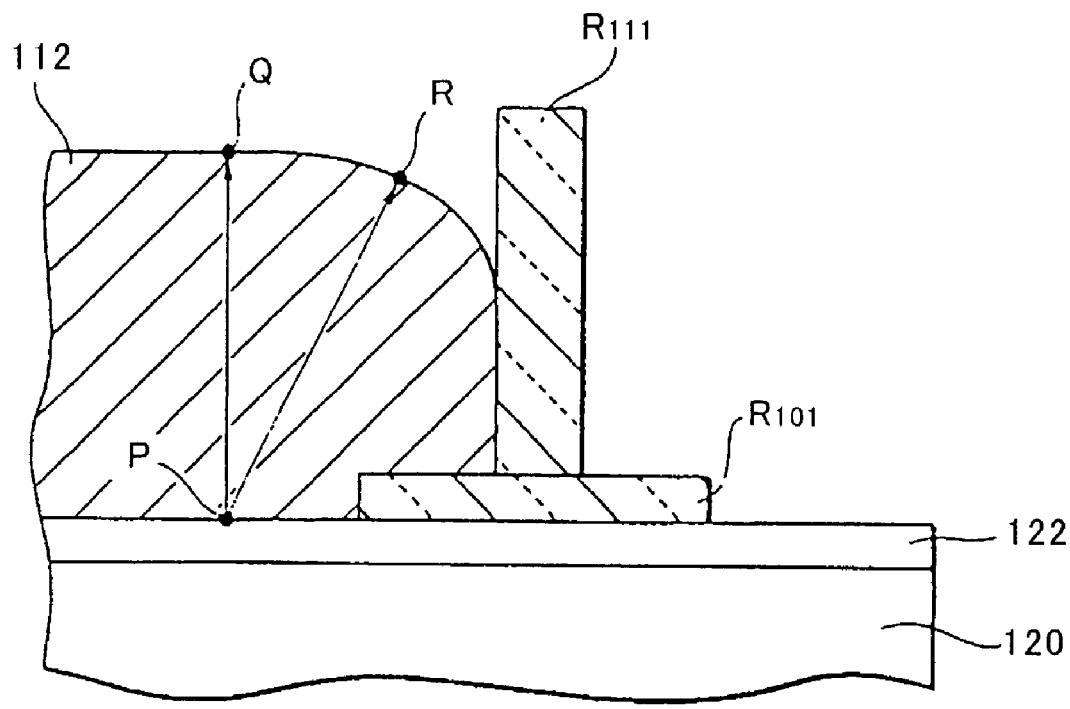
FIG. 36 is a cross sectional view showing the growing condition of a plated layer by the selective plating process in FIG. 30.

FIG. 36 illustratively shows the growth condition of the plated layer 112 relative to the resist layers $R_{101}$ and $R_{111}$. Points Q and R on the surface of the plated layer 112 are an equidistance as viewed from a point P on the Cu/Cr laminating layer 122 near the resist layer $R_{11}$. Since the plated layer 112 was grown isotropically, the plated layer 112 grows from the point P overriding the resist $R_{101}$ under the point R where the resist pattern $R_{101}$ exists and the plating base layer is not exposed. Therefore, the plated layer (fixing plate) 112 is formed spaced apart from each resist pattern at the upper circumferential area of the pattern.

In the process shown in FIG. 31, resist layers Ra to Rc are formed on the fixing plate 112 by photolithography. The resist layers Ra to Rc are formed with a pattern to expose each pin fixing part corresponding to each base of the positioning pins 112a to 112c on the fixing plate 112 shown in FIGS. 23 and 25.

Figure 32:
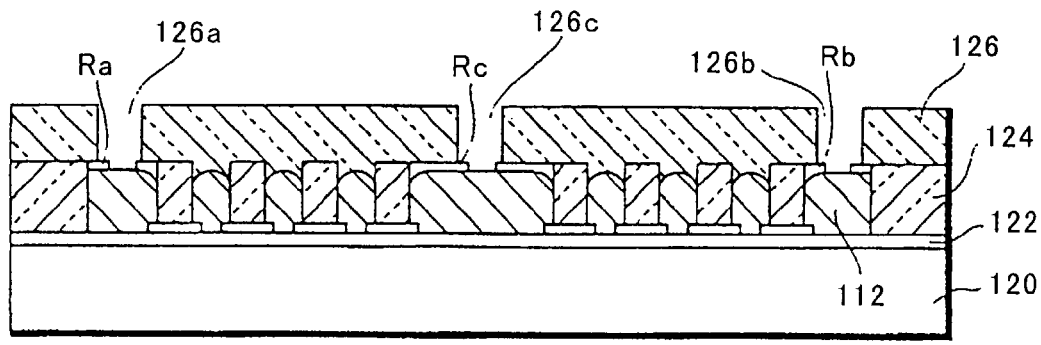
FIG. 32 is a cross sectional view illustrating a resist layer forming process after the process shown in FIG. 31.

In the process shown in FIG. 32, a resist layer 126 is formed on an upper surface of the substrate. The resist layer 126 is formed continuously with a corresponding one of the exposed pin fixing part, and has pin forming holes 126a to 126c with the size (diameter) larger than the size of the corresponding pin fixing part.

Figure 33:
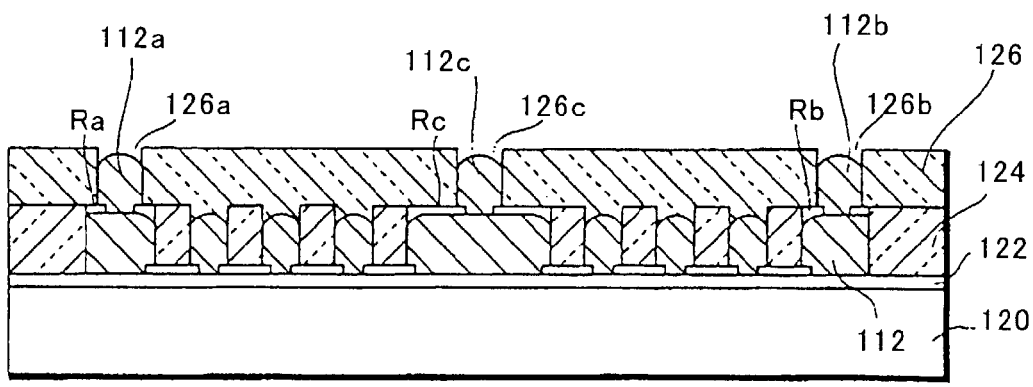
FIG. 33 is a cross sectional view illustrating a selective plating process after the process shown in FIG. 32.

In the process shown in FIG. 33, by using the resist layers Ra to Rc and 126 as masks, a selective plating process of Ni—Fe alloy is performed to form positioning pins 112a to 112b made of a Ni—Fe alloy on the fixing plate 112. At this time, each pin such as 112a is formed to decrease its size upward (to have a summit of a mountain shape).

Figure 37:
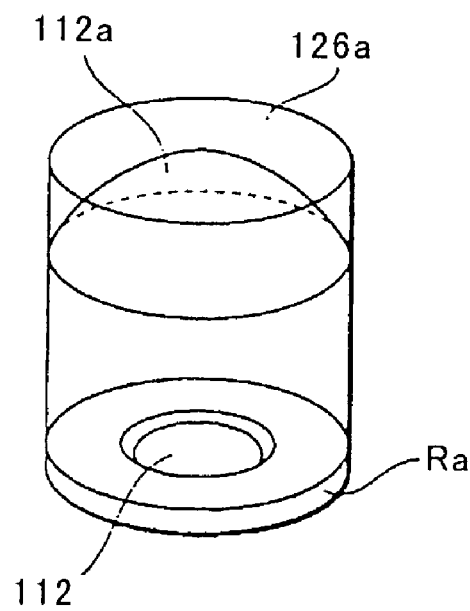
FIG. 37 is a cross sectional view showing the growing condition of a plated layer by the selective plating process in FIG. 33.

FIG. 37 shows an example of growing condition of the plating layer 112a. Since the resist layer Ra to expose the pin fixing part that has smaller diameter than a pin forming hole 126a is formed on the plating base layer (fixing plate), the plating growth near the inner circumference in the pin forming hole 126a is slower than that in the central part. Therefore, the plating layer (positioning pin) 112a is formed to have a summit of a mountain shape. If each pin such as 112a and the like has a summit of the mountain shape, operation to insert each pin into the corresponding pin inserting hole can be executed smoothly.

Figure 34:
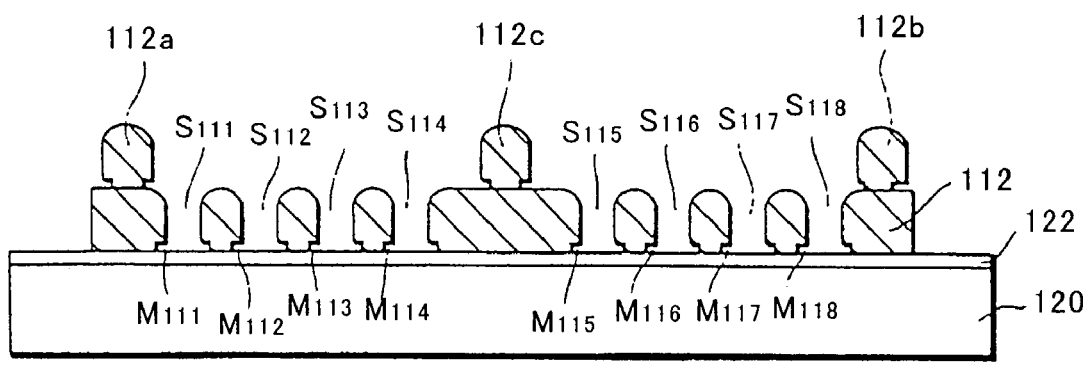
FIG. 34 is a cross sectional view illustrating a resist layer removing process after the process shown in FIG. 33.

In the process shown in FIG. 34, the resist layers $R_{101}$ to $R_{108}$, $R_{111}$ to $R_{118}$, Ra to Rc, 124 and 126 are removed by a chemical process or the like. The fixing holes $S_{111}$ to $S_{118}$ and the adhesive holes $M_{111}$ to $M_{118}$ are formed on the fixing plate 112. As a result, in the fixing plate 112, the fixing holes $S_{111}$ to $S_{118}$ are formed piercing and increasing its size from one main surface to opposite main surface, and adhering holes $M_{111}$ to $M_{118}$ are formed on one main surface of the fixing plate 112 to be continuous with the smaller size ends of the fixing holes $S_{111}$ to $S_{118}$. Moreover, the fixing holes $M_{115}$ to $M_{118}$ corresponds to four fixing holes arranged in a line along an orientation of the holes $S_{111}$ to $S_{114}$ just below an arrangement of the fixing holes along with X–X' line shown in FIGS. 23 and 24.

Figure 35:
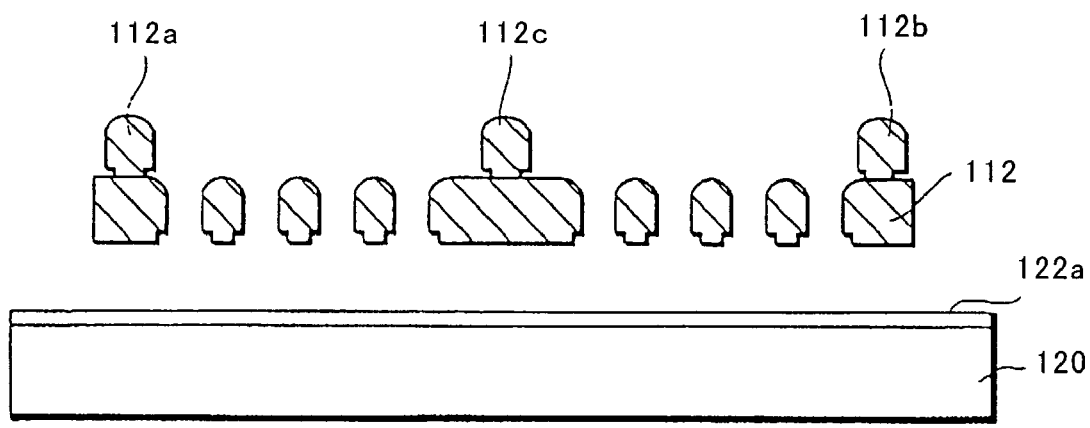
FIG. 35 is a cross sectional view illustrating a substrate separating process after the process shown in FIG. 34.

In the process shown in FIG. 35, the Cu layer of the Cu/Cr laminating layer 122 by etching to split the fixing plate 112 having the positioning pins 112a to 112c from the substrate 120. The Cr layer 122a is remained on the substrate 120.

Figure 38:
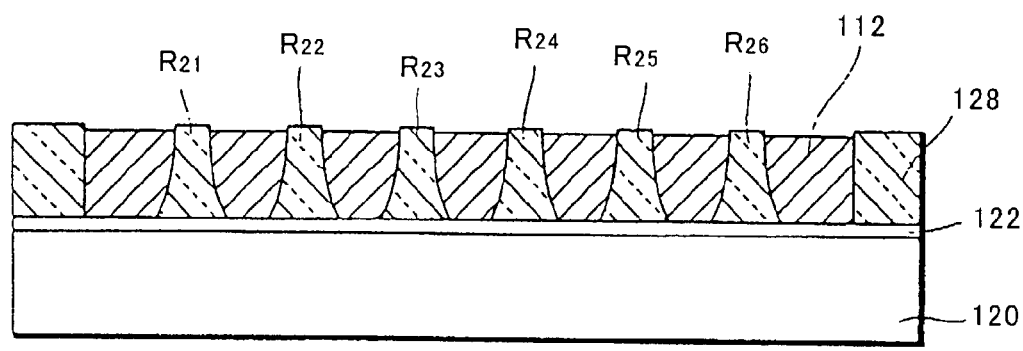
FIG. 38 is a cross sectional view showing a Cu/Cr laminating layer forming process and a selective plating process in another example of the method of manufacturing an optical fiber fixing plate according to the present invention.
Figure 39:
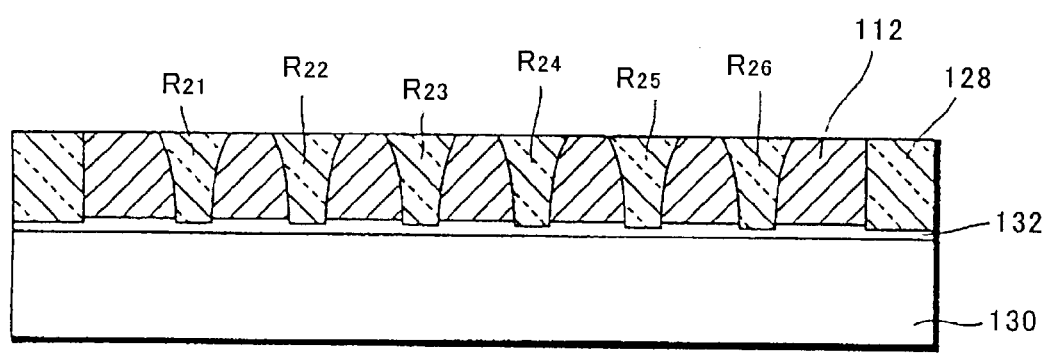
FIG. 39 is a cross sectional view showing a substrate exchanging process after the selective plating process shown in FIG. 38.
Figure 40:
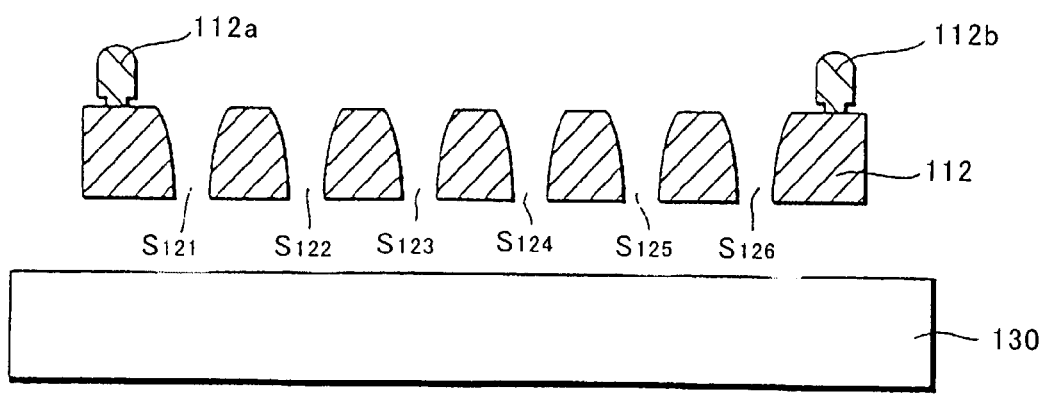
FIG. 40 is a cross sectional view showing a process to provide a positioning pin and a fixing hole on the fixing plate by using a substrate in FIG. 39.

As the optical fiber fixing plate 112 shown in FIGS. 23 to 26, the adhesive hole such as $M_{111}$ to $M_{114}$ and the like may be omitted. In this case, the fixing plate 112 can be made as shown in FIGS. 38 to 40. FIGS. 38 to 40 show an example to make the fixing plate 112 having two positioning pins 112a and 112b and six fixing holes $S_{121}$ to $S_{126}$.

In the process shown in FIG. 38, after forming Cu/Cr layer 122 on the surface of the substrate 120 as described before about FIG. 28, resist layers 128 and $R_{121}$ to $R_{126}$ are formed on the Cu/Cr laminating layer 122. The resist layer 128 has a circular hole corresponding to the plan pattern of the desired fixing plate. The resist layers $R_{121}$ to $R_{126}$ have circular patterns corresponding to the desired fixing holes to be formed in the circular hole. Each of the resist layers $R_{121}$ to $R_{126}$ has a shape increasing its size (diameter) downward. In order to form the normal taper resist shape such as the resist layers $R_{121}$ to $R_{126}$, one of the following methods is adopted by using a stepper (a reduction projection aligner):

(a) a method for setting the focal point in the resist layer;

(b) a method for setting an exposure amount smaller at the lower region of the resist layer; and (c) a method for gradually changing a transmission factor of an exposure mask (increasing the transmission factor higher at a lower position in the skirt of the resist pattern).

After forming the resist layers $R_{121}$ to $R_{126}$, by using the resist layers 128 and $R_{121}$ to $R_{126}$ as masks, a selective plating process of Ni—Fe alloy is performed to form a fixing plate 112 made of a Ni—Fe alloy layer.

In the process shown in FIG. 39, in the fixing plate 112 and the resist layers $R_{121}$ to $R_{126}$ and 128, a substrate 130 made of glass, quartz or the like is stuck on a surface where is opposite from the substrate 120 side via the adhesion layer 132. Then the Cu layer of the Cu/Cr lamination layer 122 is removed by etching to split the substrate 120 from the fixing plate 112 held by the substrate 130 and the resist layers $R_{121}$ to $R_{126}$ and 128. FIG. 39 shows the substrate 130 in a condition that the fixing plate 112 and the resist layers $R_{121}$ to $R_{126}$ and 128 are above the substrate 130. A resin substrate that can exfoliate may be used for the substrate 130.

In the process shown in FIG. 40, the positioning pins 112*a* and 112*b* are formed on the fixing plate 112 by the process same as the before-described process in FIGS. 31 to 34, and fixing holes $S_{121}$ to $S_{126}$ are made in the fixing plate 112. Each fixing hole increases its size downward the resist layers in FIG. 38. Since the upper and lower sides are made upside down in the process in FIG. 39, each fixing hole in the fixing plate 112 increases its size upward the resist layers. After that, the adhesive layer 132 is removed by a chemical process or the like to split the fixing plate 112 having the positioning pins 112*a* and 112*b* and the fixing holes $S_{121}$ to $S_{126}$ from the substrate 130.

According to the above-described optical fiber fixing plate manufacturing method in the second embodiment, the position and size of each of the optical fiber fixing holes $S_{111}$ to $S_{118}$, $M_{111}$ to $M_{118}$ and $S_{121}$ to $S_{126}$, the optical fiber fixing hole pitch and the position and size of positioning pins such as 112*a*, 112*b* and the like can be set at a sub-micron precision such as 0.5 μm, and the fixing plate 112 can be made easily and precisely.

Figure 41:
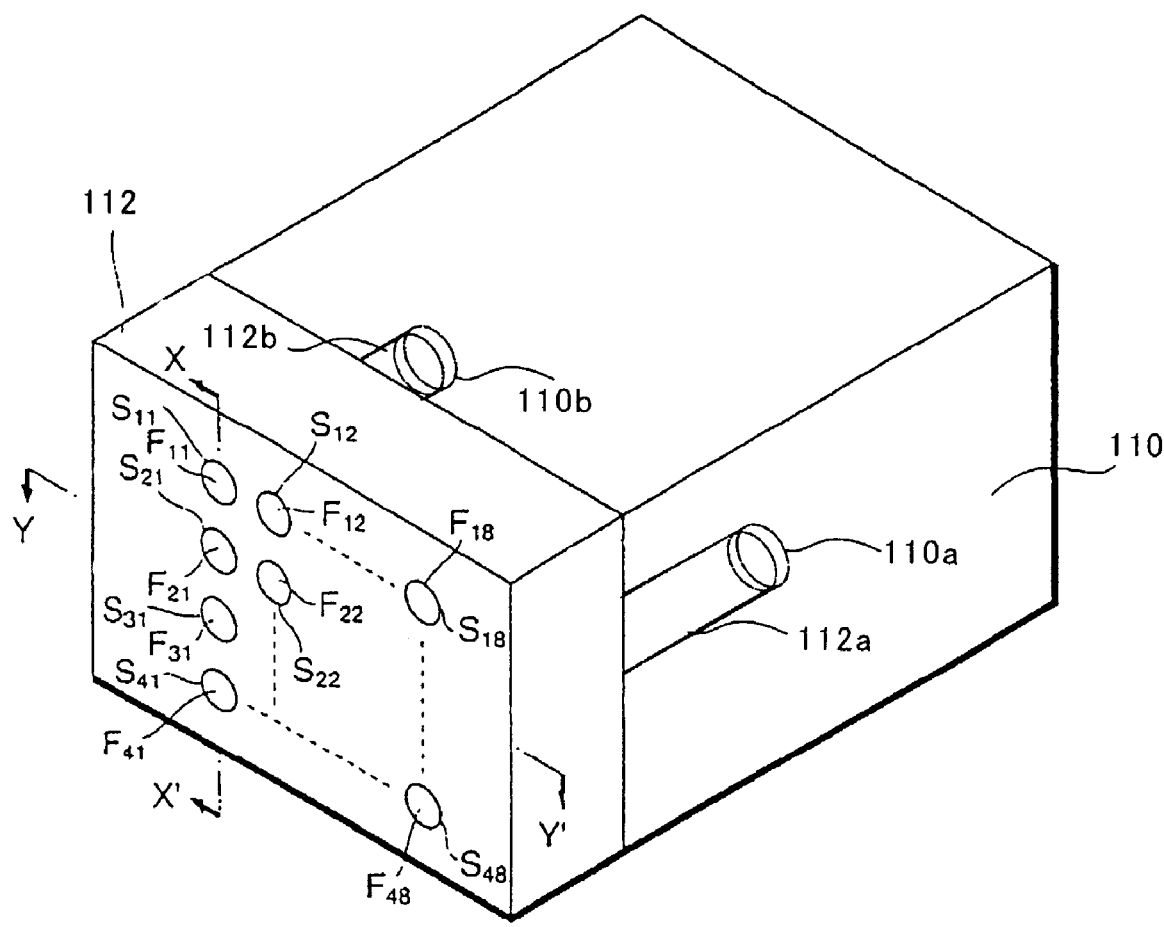
FIG. 41 is a perspective view showing a two-dimensional optical fiber array according to a modified exampled of the second embodiment of the present invention.

FIG. 41 is a perspective view showing a two-dimensional optical fiber array according to a modified exampled of the second embodiment of the present invention.

In this modified example, the optical fiber holder 110 and the fixing plate 112 are made to be a square shape similar to the first embodiment. That is, the positioning pins 112*a* and 112*b* are formed in the square-shaped fixing plate 112, and the positioning pin inserting holes 110*a* and 110*b* are formed in the square-shaped holder 110.

Figure 42:
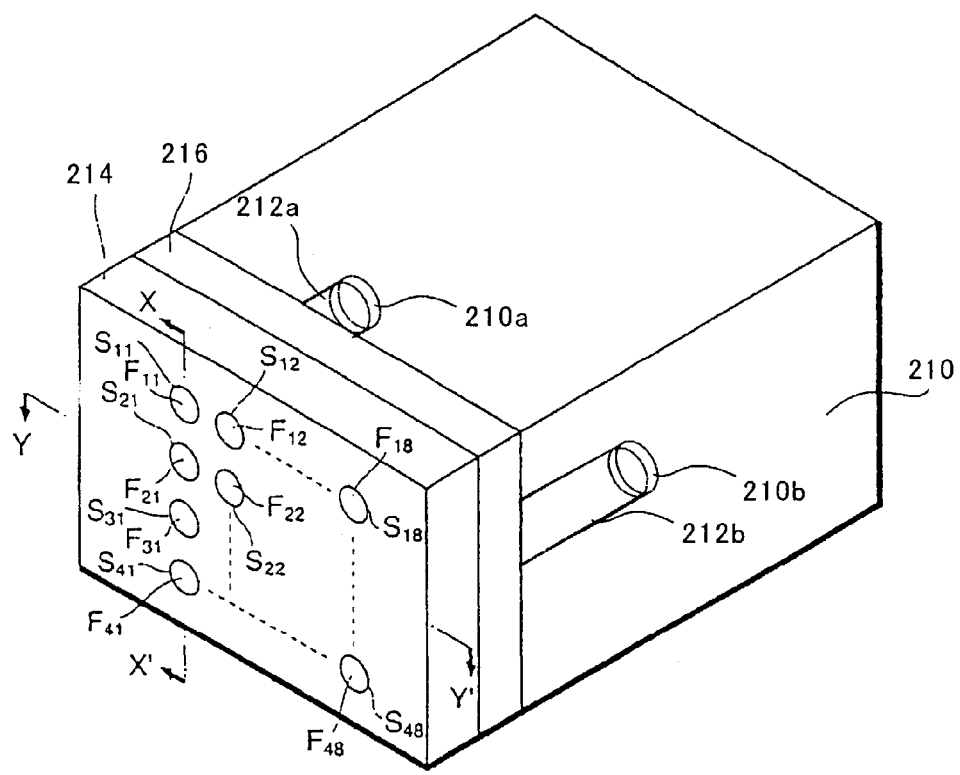
FIG. 42 is a perspective view showing one example of a two-dimensional optical fiber array according to a third embodiment of the present invention.

FIG. 42 is a perspective view showing one example of a two-dimensional optical fiber array according to a third embodiment of the present invention.

This third embodiment is a combination of the above-described first and second embodiments. That is, an optical fiber holder 210 has positioning pin inserting holes 210*a* and 210*b* similar to the positioning pin inserting holes 110*a* and 110*b* of the holder 110 of the second embodiment, and a reinforcement layer 216 has the same feature as the reinforcement layer 16 of the first embodiment and also has positioning pins 212*a* and 212*b* similar to the fixing plate 112 of the second embodiment.

Figure 43:
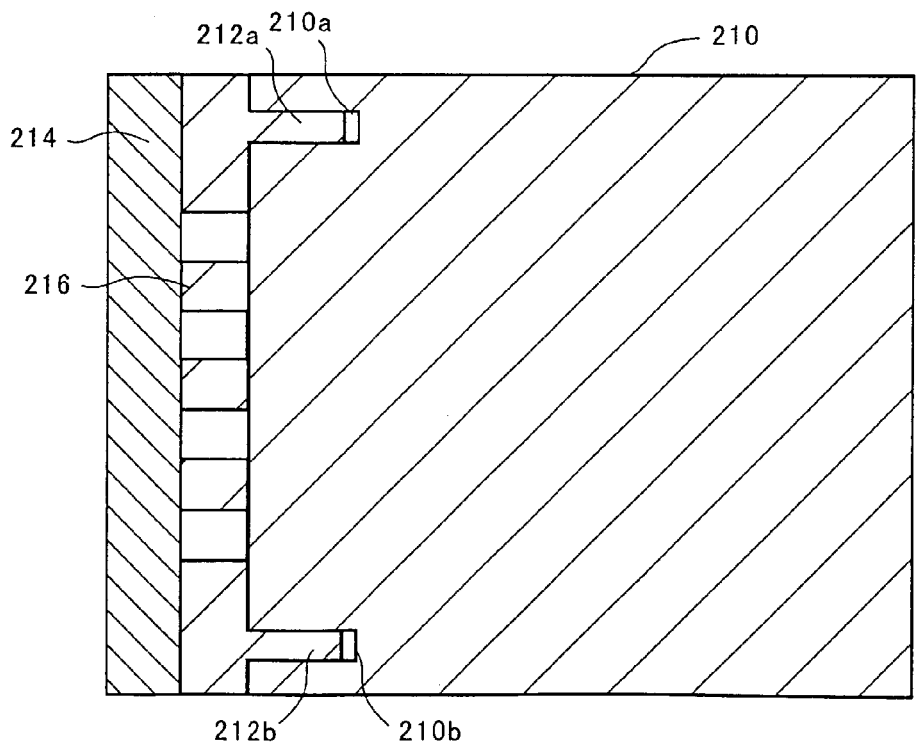
FIG. 43 is a cross sectional view taken along line Y–Y' shown in FIG. 42.

FIG. 43 is a cross sectional view taken along line Y–Y' shown in FIG. 42.

Obviously from the drawing the positioning pins 212*a* and 212*b* are projecting from the reinforcement layer 216 and are inserted to the pin inserting holes 210*a* and 210*b*. Similar to the second embodiment, the length of each positioning pin is smaller than the depth of each pin inserting hole.

Figure 44:
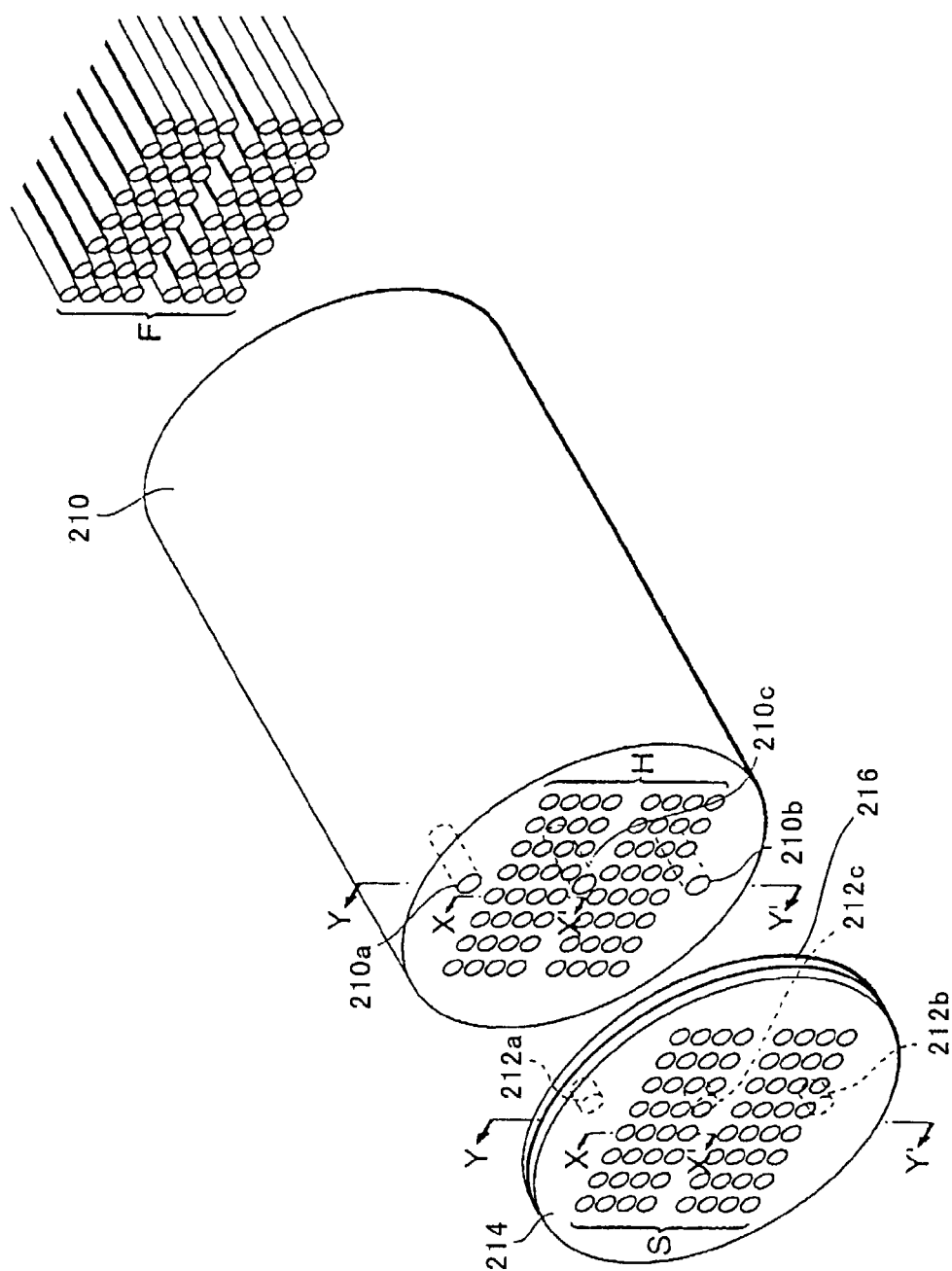
FIG. 44 is a perspective view showing a condition before another example of a two-dimensional optical fiber array according to a second embodiment of the present invention is assembled.
Figure 45:
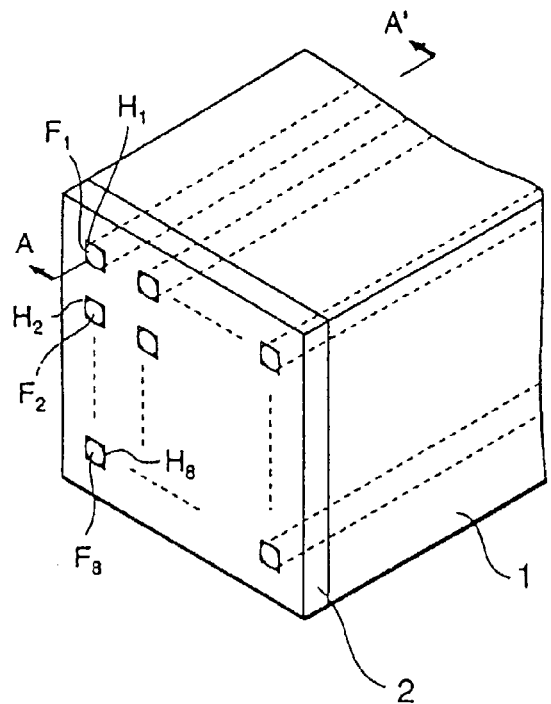
FIG. 45 is a perspective view showing an example of a conventional two-dimensional optical fiber array.
Figure 46:
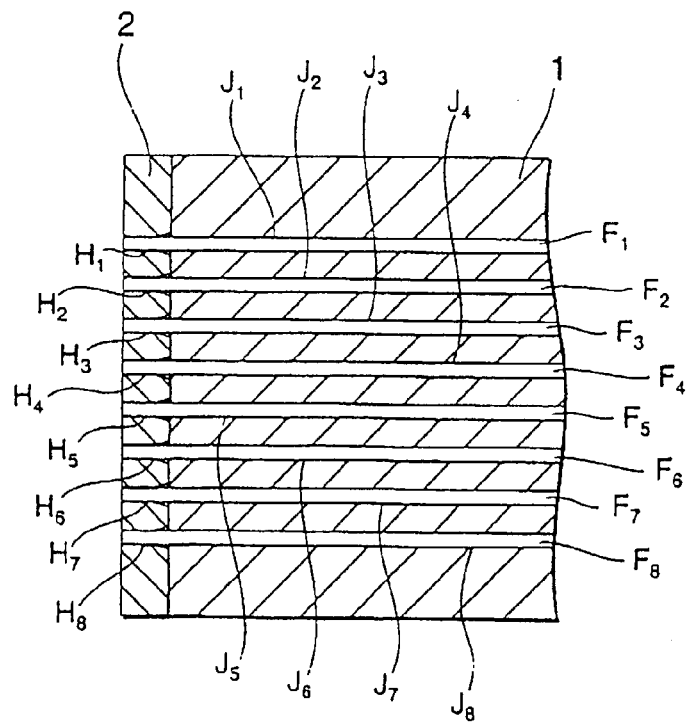
FIG. 46 is a cross sectional view taken along line A–A' shown in FIG. 45.

FIG. 44 is a perspective view showing a condition before another example of a two-dimensional optical fiber array according to a second embodiment of the present invention is assembled.

In this example, the optical fiber array is shaped in a cylindrical shape similar to the second embodiment. Only difference between the second embodiment and this example of the third embodiment is that the reinforcement layer 216 having positioning pins 212*a* to 212*c* are attached to the fixing plate 214. Since the reinforcement layer 216 is equipped with the positioning pins 212*a* to 212*c*, the fixing plate 214 does not have positioning pins.

Further, the positioning pins 212*a* and 212*b* (or 212*a* to 212*c*) are formed on one main surface of the reinforcement layer 216, the positioning pins 212*a* and 212*b* (or 212*a* to 212*c*) may be formed on one main surface of the fixing plate 214. In this case, the reinforcement layer 216 should be equipped with positioning pin piercing holes corresponding to the positioning pins 212*a* and 212*b* (or 212*a* to 212*c*) for the positioning pins 212*a* and 212*b* (or 212*a* to 212*c*) to be inserted in the pin inserting holes 210*a* and 210*b* (or 210*a* to 210*c*) through the positioning pin piercing holes.

The present invention has been described in connection with the preferred embodiments. The invention is not limited only to the above embodiments. It is apparent that various modifications, improvements, combinations, and the like can be made by those skilled in the art. For example, following modification can be performed.

The shape of the optical fiber holder 10 (or 110) is not limited only to a rectangular prism, but it may be a cylinder, a polygonal prism (e.g., a triangular prism and a hexagonal prism), and the like.

The shape of each of the holding hole and pin inserting hole of the optical fiber holder 10 (or 110) and the shape of each of the fixing hole and pin inserting hole of the fixing plate 14 (or 112) are not limited only to a circle, but they may be a polygon (e.g., a triangle, a square, a parallelogram, and a hexagon) and the like. If the pin inserting hole of the holder 10 (or 110) and fixing plates 14 (or 112) has a polygon shape, the positioning pin has the same polygon shape. In this case, since the positioning pin does not rotate, a single positioning pin may be used.

The invention is not limited only to a two-dimensional optical fiber array, but it may be applied to a one-dimensional optical fiber array and a single optical fiber holder (position alignment of one optical fiber).

What is claimed is:

1. An optical fiber array, comprising:
   a plurality of optical fibers;
   an optical fiber holder having a plurality of optical fiber holding holes, each optical fiber holding hole receiving a respective one of the optical fibers such that each optical fiber extends through the optical fiber holder;
   an optical fiber fixing plate having at least one optical fiber fixing hole, each optical fiber fixing hole corresponding to a respective one of the optical fiber holding holes, a sidewall of each optical fiber fixing hole having a smooth tapered curve which allows an optic fiber to be inserted into the optical fiber fixing hole without contacting any sharp edges;
   a reinforcement layer between the optical fiber holder and the optical fiber fixing plate having at least one optical fiber hole corresponding to a respective one of the optical fiber holding holes; and
   a fixing device that fixes the optical fiber to the optical fiber fixing plate.

2. An optical fiber array according to claim 1, further comprising
the reinforcement layer has an optical fiber piercing hole corresponding to the optical fiber fixing hole, wherein
the fixing device fixes the optical fiber to the optical fiber fixing plate in a condition that the optical fiber fixing plate is attached to one end surface of the optical fiber holder on the reinforcement layer side and the optical fiber is inserted to the corresponding optical fiber holding hole, corresponding optical fiber piercing hole of the reinforcement layer and the corresponding optical fiber fixing hole of the optical fiber fixing plate.

3. An optical fiber array manufacturing method, comprising:
(a) preparing at least one optical fiber, an optical fiber holder having at least one optical fiber holding hole corresponding to a respective one of the optical fiber and at least either one of positioning pin inserting hole or positioning pin formed on one end surface, an optical fiber fixing plate having an optical fiber fixing hole corresponding to a respective one of the optical fiber holding holes formed to pierce one main surface of the optical fiber fixing plate to another main surface a sidewall of each optical fiber fixing hole having a smooth tapered curve which allows the respective optic fiber to be inserted into the optical fiber fixing hole without contacting any sharp edges, and either one of a positioning pin in correspondence with the positioning pin inserting hole formed on the one end surface of the optical fiber folder or positioning pin inserting hole formed on the another main surface in correspondence with the positioning pin formed on the one end surface of the optical fiber folder and a reinforcement layer between the optical fiber holder and the optical fiber fixing plate having at least one optical fiber hole corresponding to a respective one of the optical fiber holding holes;
(b) attaching the optical fiber fixing plate to the one end surface of the optical fiber holder by fitting the positioning pin into the positioning pin inserting hole;
(c) inserting the optical fiber to the corresponding optical fiber holding hole of the optical fiber holder and the corresponding optical fiber fixing hole of the optical fiber fixing plate from the another end surface of the optical fiber holder in a condition that the optical fiber fixing plate is attached to the optical fiber holder; and
(d) fixing the optical fiber to the optical fiber fixing plate in a condition that the optical fiber fixing plate is attached to the one end surface of the optical fiber holder by fitting the positioning pin into the positioning pin inserting hole and the optical fiber is inserted to the corresponding optical fiber holding hole of the optical fiber holder and the corresponding optical fiber fixing hole of the optical fiber fixing plate.

4. An optical fiber array manufacturing method according to claim 3, further comprising the step of (e) planarizing the one main surface of the optical fiber fixing plate by polishing in a condition that the optical fiber is fixed to the optical fiber fixing plate.

5. An optical fiber array manufacturing method according to claim 3, wherein
a depth of the positioning pin inserting hole of the optical fiber holder is deeper than an entire length of the positioning pin of the optical fiber fixing plate, and
the fixing step (d) fixes the optical fiber at a section of the optical fiber holder deeper than a predetermined position that is deeper than a tip position of the positioning pin and shallower than a bottom of the positioning pin inserting hole in a condition that the optical fiber fixing plate is attached to one end surface of the optical fiber holder by fitting the positioning pin into the positioning pin inserting hole and the optical fiber is inserted to the corresponding optical fiber holding hole of the optical fiber holder and the corresponding optical fiber fixing hole of the optical fiber fixing plate, and the method further comprising the step of
(e) removing a section of the optical fiber holder from the one end surface to a predetermined point, and
(f) planarizing a surface where the section of the optical fiber holder is removed with keeping the optical fiber being fixed at the section of the optical fiber holder deeper than the predetermined position on the one end surface and using a reaming portion of the positioning pin inserting hole as a guide pin inserting hole.

6. An optical fiber array manufacturing method according to claim 3, wherein
the preparing step (a) further prepares a reinforcement layer formed on the another main surface of the optical fiber fixing plate and having an optical fiber piercing hole corresponding to the optical fiber fixing hole and a pin piercing hole corresponding to the pin inserting hole, and
the fixing step (d) fixes the optical fiber to the optical fiber fixing plate in a condition that the optical fiber fixing plate is attached to one end surface of the optical fiber holder on the reinforcement layer side and the optical fiber is inserted to the corresponding optical fiber holding hole, corresponding optical fiber piercing hole of the reinforcement layer and the corresponding optical fiber fixing hole of the optical fiber fixing plate.

7. An optical fiber array manufacturing method according to claim 6, further comprising the step of (e) planarizing the one main surface of the optical fiber fixing plate by polishing in a condition that the optical fiber is fixed to the optical fiber fixing plate.

8. An optical fiber array manufacturing method according to claim 6, wherein
the preparing step (a) further prepares a positioning pin to be inserted into the positioning pin inserting holes and the pin piercing hole.

9. An optical fiber array manufacturing method according to claim 8, further comprising the step of (e) planarizing the one main surface of the optical fiber fixing plate by polishing in a condition that the optical fiber is fixed to the optical fiber fixing plate.

10. An optical fiber fixing plate used in conjunction with an optical fiber holder that has a plurality of optical fiber holding holes, each optical fiber holding hole adapted to receive a corresponding optical fiber, the optical fiber fixing plate comprising:
an optical fiber fixing hole corresponding to a respective one of the optical fiber holding hole formed to pierce one main surface of the optical fiber fixing plate to another main surface, a sidewall of each optical fiber holding hole having a smooth tapered curve which allows the optical fiber to be inserted into the optical fiber fixing hole without contacting any sharp edges.

11. An optical fiber fixing plate according to claim 10, further comprising a reinforcement layer formed on the another main surface and having an optical fiber piercing hole corresponding to the optical fiber fixing hole.

12. The optical fiber array according to claim 1, wherein the reinforcement layer is integrally formed on the fixing plate.

13. An optical fiber array, comprising:

n optical fibers, n being an integer greater than or equal to 1;

an optical fiber holder having n optical fiber holding holes, each optical fiber holding hole receiving a respective one of the optical fibers such that each optical fiber extends through the optical fiber holder, a sidewall of each optical fiber holding hole having a smooth tapered curve which allows an optic fiber to be inserted into the optical fiber fixing hole without contacting any sharp edges;

an optical fiber fixing plate having n optical fiber fixing holes, each optical fiber fixing hole corresponding to a respective one of the optical fiber holding holes, a sidewall of each optical fiber fixing hole having a smooth tapered curve which allows an optic fiber to be inserted into the optical fiber fixing hole without contacting any sharp edges;

a reinforcement layer between the optical fiber holder and the optical fiber fixing plate having n optical fiber holes corresponding to a respective one of the optical fiber holding holes; and a fixing device that fixes the optical fiber to the optical fiber fixing plate.

14. The optical fiber array according to claim 13, wherein the reinforcement layer is integrally formed on the fixing plate.

15. An optical fiber array, comprising:

n optical fibers, n being an integer greater than or equal to 1;

an optical fiber holder having n optical fiber holding holes, each optical fiber holding hole receiving a respective one of the optical fibers;

an optical fiber fixing plate having n optical fiber fixing holes, each optical fiber fixing hole corresponding to a respective one of the optical fiber holding holes;

a reinforcement layer between the optical fiber holder and the optical fiber fixing plate having n optical fiber holes each corresponding to a respective one of the optical fiber holding holes, the reinforcement layer being integrally formed on the optical fiber fixing plate; and a fixing device that fixes the optical fiber to the optical fiber fixing plate.

16. An optical fiber holding array, comprising:

an optical fiber holder having a plurality of optical fiber holding holes, each optical fiber holding hole adapted to receive a respective one of a plurality of optical fibers;

an optical fiber fixing plate having at least one an optical fiber fixing hole, each optical fiber fixing hole corresponding to a respective one of the optical fiber holding holes;

a reinforcement layer between the optical fiber holder and the optical fiber fixing plate having at least one optical fiber hole corresponding to a respective one of the optical fiber holding holes, the reinforcement layer is integrally formed on the optical fiber fixing plate; and a fixing device adapted to fix the optical fiber to the optical fiber fixing plate.

17. An optical fiber fixing plate used in conjunction with an optical fiber holder that has a plurality of optical fiber holding holes, each optical fiber holding holes adapted to receive a corresponding optical fiber, the optical fiber fixing plate comprising:

an optical fiber fixing hole corresponding to a respective one of the optical fiber holding hole formed to pierce one main surface of the optical fiber fixing plate to another main surface; and a reinforcement layer that is integrally formed on the optical fiber fixing plate.

* * * * *